(12) United States Patent
Boyle et al.

(10) Patent No.: US 9,313,394 B2
(45) Date of Patent: Apr. 12, 2016

(54) WATERPROOF ELECTRONIC DEVICE

(71) Applicant: H4 Engineering, Inc., San Antonio, TX (US)

(72) Inventors: Christopher T. Boyle, San Antonio, TX (US); Scott K. Taylor, San Antonio, TX (US); Alexander G. Sammons, San Antonio, TX (US); Denes Marton, San Antonio, TX (US)

(73) Assignee: H4 Engineering, Inc., San Antonio, TX (US)

( * ) Notice: Subject to any disclaimer, the term of this patent is extended or adjusted under 35 U.S.C. 154(b) by 253 days.

(21) Appl. No.: 13/784,536

(22) Filed: Mar. 4, 2013

(65) Prior Publication Data

US 2013/0230293 A1 Sep. 5, 2013

Related U.S. Application Data

(60) Provisional application No. 61/606,358, filed on Mar. 2, 2012, provisional application No. 61/606,975, filed on Mar. 5, 2012, provisional application No. 61/606,976, filed on Mar. 5, 2012, provisional application No. 61/606,981, filed on Mar. 5, 2012, provisional application No. 61/607,549, filed on Mar. 6, 2012, provisional application No. 61/745,346, filed on Dec. 21, 2012.

(51) Int. Cl.
*G03B 17/08* (2006.01)
*H04N 5/232* (2006.01)
*H04N 5/225* (2006.01)
*F16M 11/10* (2006.01)

(52) U.S. Cl.
CPC ........... *H04N 5/23203* (2013.01); *F16M 11/10* (2013.01); *H04N 5/2251* (2013.01); *H04N 5/23219* (2013.01); *F16M 2200/022* (2013.01)

(58) Field of Classification Search
CPC .............................. G03B 17/08; H04N 5/2252
USPC .......................................................... 396/25
See application file for complete search history.

(56) References Cited

U.S. PATENT DOCUMENTS 3,469,148 A * 9/1969 Lund ............................. 361/783
4,041,507 A * 8/1977 Chan et al. ...................... 396/28

(Continued)

FOREIGN PATENT DOCUMENTS

EP           0660131 A1    6/1995
JP         2005020205 A    1/2005

(Continued)

OTHER PUBLICATIONS

E. Calais, The Global Positioning System, Presentation Slides, available at date of publication unknown, available at URL web.ics.purdue.edu/~ecalais/teaching/geodesy/GPS_observables.pdf.

(Continued)

*Primary Examiner* — Rodney Fuller
(74) *Attorney, Agent, or Firm* — Volk & McElroy, LLP; Michael D. Volk, Jr.

(57) ABSTRACT

A waterproof electronic device with a soft polymer embedding enclosure configured to seal components embedded in the soft polymer embedding enclosure from water by direct contact of the soft polymer embedding enclosure with the components, and including an embedded microswitch operated by pressing on an outer surface of the soft polymer embedding enclosure. The apparatus may be built using various degrees of integration of its components.

10 Claims, 19 Drawing Sheets

(56) References Cited

U.S. PATENT DOCUMENTS

| | | | |
|---|---|---|---|
| 4,153,357 A * | 5/1979 | Winnacker et al. | 396/25 |
| 4,244,591 A * | 1/1981 | Umetsu | 277/436 |
| 4,683,729 A | 8/1987 | Rogers | |
| 4,814,711 A | 3/1989 | Olsen et al. | |
| 4,980,871 A | 12/1990 | Sieber et al. | |
| 5,073,824 A | 12/1991 | Vertin | |
| 5,363,297 A | 11/1994 | Larson et al. | |
| 5,430,473 A | 7/1995 | Beecher, II et al. | |
| 5,438,357 A | 8/1995 | McNelley | |
| 5,457,370 A | 10/1995 | Edwards | |
| 5,463,432 A | 10/1995 | Kahn | |
| 5,491,632 A | 2/1996 | Pawlak et al. | |
| 5,572,317 A | 11/1996 | Parker et al. | |
| 5,640,007 A | 6/1997 | Talbott et al. | |
| 5,668,629 A | 9/1997 | Parker et al. | |
| 5,764,786 A | 6/1998 | Kuwashima et al. | |
| 5,802,412 A | 9/1998 | Kahn | |
| 5,878,151 A | 3/1999 | Tang et al. | |
| 5,912,980 A | 6/1999 | Hunke | |
| 5,973,732 A | 10/1999 | Guthrie | |
| 6,002,428 A | 12/1999 | Matsumura et al. | |
| 6,014,167 A | 1/2000 | Suito et al. | |
| 6,031,568 A | 2/2000 | Wakitani | |
| 6,035,067 A | 3/2000 | Ponticos | |
| 6,075,557 A | 6/2000 | Holliman et al. | |
| 6,130,964 A | 10/2000 | Marques et al. | |
| 6,173,066 B1 | 1/2001 | Peurach et al. | |
| 6,188,777 B1 | 2/2001 | Darrell et al. | |
| 6,355,881 B1 * | 3/2002 | Braeges et al. | 174/521 |
| 6,519,860 B1 | 2/2003 | Bieg et al. | |
| 6,596,976 B2 | 7/2003 | Lin et al. | |
| 6,603,408 B1 * | 8/2003 | Gaba | G06F 3/0221 200/512 |
| 6,650,360 B1 | 11/2003 | Osen | |
| 6,690,978 B1 | 2/2004 | Kirsch | |
| 6,744,403 B2 | 6/2004 | Milnes et al. | |
| 6,751,409 B2 * | 6/2004 | Nakamura | 396/25 |
| 6,771,213 B2 | 8/2004 | Durst et al. | |
| 6,795,110 B1 * | 9/2004 | Kossin | 348/81 |
| 6,867,799 B2 | 3/2005 | Broemmelsiek | |
| 6,952,646 B2 | 10/2005 | Chang | |
| 6,972,787 B1 | 12/2005 | Allen et al. | |
| 7,050,712 B2 * | 5/2006 | Shimamura | 396/27 |
| 7,060,921 B2 * | 6/2006 | Kubo | 200/302.1 |
| 7,239,975 B2 | 7/2007 | Coleman et al. | |
| 7,245,251 B2 | 7/2007 | Vogel et al. | |
| 7,349,008 B2 | 3/2008 | Rui et al. | |
| 7,365,771 B2 | 4/2008 | Kahn et al. | |
| 7,426,338 B2 * | 9/2008 | Matsumoto et al. | 396/25 |
| 7,450,835 B2 | 11/2008 | Lackey et al. | |
| 7,477,839 B2 * | 1/2009 | Funahashi et al. | 396/25 |
| 7,547,875 B1 | 6/2009 | Tsai et al. | |
| 7,557,825 B2 | 7/2009 | Ishii et al. | |
| 7,591,195 B2 | 9/2009 | Puzio | |
| 7,672,781 B2 | 3/2010 | Churchill et al. | |
| 7,751,696 B2 * | 7/2010 | Tatamiya | 396/25 |
| 7,855,638 B2 | 12/2010 | Huston | |
| 7,920,163 B1 * | 4/2011 | Kossin | 348/81 |
| D640,679 S * | 6/2011 | Willes et al. | D14/250 |
| 8,294,843 B2 * | 10/2012 | Hollaway | 349/58 |
| 8,944,614 B2 * | 2/2015 | Parrill | 359/511 |
| 8,953,117 B2 * | 2/2015 | Rosenau et al. | 349/58 |
| 2001/0030856 A1 | 10/2001 | Wilson | |
| 2002/0005902 A1 | 1/2002 | Yuen | |
| 2002/0057217 A1 | 5/2002 | Milnes et al. | |
| 2002/0149681 A1 | 10/2002 | Kahn et al. | |
| 2003/0025614 A1 | 2/2003 | Kahn | |
| 2003/0214710 A1 | 11/2003 | Takahashi et al. | |
| 2004/0006424 A1 | 1/2004 | Joyce et al. | |
| 2004/0105010 A1 | 6/2004 | Osen | |
| 2004/0119716 A1 | 6/2004 | Park et al. | |
| 2005/0083433 A1 | 4/2005 | Wishart et al. | |
| 2005/0134458 A1 | 6/2005 | Leyden et al. | |
| 2005/0174084 A1 | 8/2005 | Nakai et al. | |
| 2005/0220448 A1 * | 10/2005 | Tei et al. | 396/25 |
| 2006/0045613 A1 | 3/2006 | Leyden et al. | |
| 2006/0077258 A1 | 4/2006 | Allen et al. | |
| 2007/0019073 A1 | 1/2007 | Comaniciu et al. | |
| 2007/0146484 A1 | 6/2007 | Horton et al. | |
| 2007/0164905 A1 | 7/2007 | Lempkowski et al. | |
| 2007/0247615 A1 | 10/2007 | Bridges | |
| 2007/0292118 A1 * | 12/2007 | Traff | 396/25 |
| 2008/0001022 A1 | 1/2008 | Sa et al. | |
| 2008/0002031 A1 | 1/2008 | Cana et al. | |
| 2008/0015000 A1 * | 1/2008 | Jung | 455/575.1 |
| 2008/0062711 A1 | 3/2008 | Veenstra et al. | |
| 2008/0105527 A1 | 5/2008 | Leftly | |
| 2008/0192116 A1 | 8/2008 | Tamir et al. | |
| 2008/0225137 A1 | 9/2008 | Kubo et al. | |
| 2008/0253140 A1 | 10/2008 | Fleischmann et al. | |
| 2008/0271220 A1 | 11/2008 | Chilton et al. | |
| 2009/0028386 A1 | 1/2009 | Michimoto et al. | |
| 2009/0080153 A1 * | 3/2009 | Richardson et al. | 361/679.56 |
| 2009/0096871 A1 | 4/2009 | Kuwano et al. | |
| 2009/0145371 A1 | 6/2009 | Kramer | |
| 2009/0154182 A1 | 6/2009 | Veenstra et al. | |
| 2009/0167867 A1 | 7/2009 | Lin et al. | |
| 2009/0206077 A1 * | 8/2009 | Melmon et al. | 220/4.02 |
| 2009/0267895 A1 | 10/2009 | Bunch | |
| 2009/0300122 A1 | 12/2009 | Freer | |
| 2010/0026809 A1 | 2/2010 | Curry | |
| 2010/0030856 A1 | 2/2010 | Blum et al. | |
| 2010/0118149 A1 | 5/2010 | Levin et al. | |
| 2010/0149399 A1 | 6/2010 | Mukai et al. | |
| 2010/0186214 A1 * | 7/2010 | Judge | B60Q 1/2696 29/445 |
| 2010/0191651 A1 | 7/2010 | Irmscher et al. | |
| 2010/0238262 A1 | 9/2010 | Kurtz et al. | |
| 2010/0245532 A1 | 9/2010 | Kurtz et al. | |
| 2011/0050878 A1 | 3/2011 | Wells et al. | |
| 2011/0090341 A1 | 4/2011 | Ikewada et al. | |
| 2011/0109554 A1 | 5/2011 | Boissier | |
| 2011/0163908 A1 | 7/2011 | Andersson et al. | |
| 2011/0187865 A1 | 8/2011 | Felt et al. | |
| 2011/0211820 A1 * | 9/2011 | Yim | 396/27 |
| 2011/0228098 A1 | 9/2011 | Lamb et al. | |
| 2012/0112347 A1 * | 5/2012 | Eckhardt et al. | 257/751 |
| 2012/0169865 A1 * | 7/2012 | Tsai | 348/81 |
| 2012/0218415 A1 | 8/2012 | Chun et al. | |
| 2012/0219271 A1 | 8/2012 | Vunic et al. | |
| 2012/0262618 A1 * | 10/2012 | Weakly | 348/333.01 |
| 2012/0269386 A1 | 10/2012 | Hankins et al. | |
| 2012/0321294 A1 * | 12/2012 | Tages et al. | 396/535 |
| 2013/0016960 A1 * | 1/2013 | Yang | 396/25 |
| 2013/0077931 A1 | 3/2013 | Cornell et al. | |
| 2013/0242080 A1 * | 9/2013 | Kossin | 348/81 |
| 2013/0278845 A1 | 10/2013 | Pishnyak et al. | |
| 2014/0152890 A1 * | 6/2014 | Rayner | 348/376 |
| 2014/0226062 A1 * | 8/2014 | Parrill | 348/376 |

FOREIGN PATENT DOCUMENTS

| | | |
|---|---|---|
| KR | 1019980043069 A | 8/1998 |
| WO | 9501768 A1 | 6/1995 |
| WO | 0141428 A1 | 6/2001 |

OTHER PUBLICATIONS

Gibbings et al., Assessing the Accuracy and Integrity of RTK GPS Beneath High Voltage Power Lines, 2001—A Spatial Odyssey: 42nd Australian Surveyors Congress, date of publication unknown, available at URL eprints.usq.edu.au/2606/1/gibbings.pdf.

Oncore, Chapter 2 GPS Principles, date of publication unknown, available at URL gpsd.berlios.de/vendor-docs/motorola/ch2.pdf.

Dana M. Sommer, Principles of GPS , Presentation Slides, date of publication unknown, available at URL des.memphis.edu/esra/.../Principles%20of%20GPS%204-13-04.pdf.

Kaplan et al., Understanding GPS Principles and Applications, book, 2006, Artech House, available at URL http://www.bdu.ac.in/ckr/uploads/Earth/GPS%20FULL%20All%20in%201.pdf.

Clifford et al., Measuring Tilt with Low-g Accelerometers, Freescale Semiconductor Application Note, May 2005, Freescale Semiconduc-

(56) References Cited

OTHER PUBLICATIONS tor, available at URL http://classes.cecs.ucf.edu/seecsseniordesign/su2006fa2006/g09/files/patrick/measuring%20tilt%20with%20low-g%20accelerometers.pdf.
Kimberly Tuck, Tilt Sensing Using Linear Accelerometers, Freescale Semiconductor Application Note, Jun. 2007, Freescale Semiconductor, available at URL http://www.mh-hannover.de/fileadmin/zentrale_einrichtungen/zentrale_forschungswerkst/downloads/AN3461.pdf.
Barwani et al., Vehicle Dynamics Lab GPS Tracking Camera Turret, web site, 2009, available at URL http://www.me.berkeley.edu/ME102B/Past_Proj/f09/17%20GPS%20Camera%20Turret%20Website/Home.html.
Dr. Jacob Tal, Motion Control Made Easy, PT Design, p. 62, 64 (Oct. 2000).

* cited by examiner

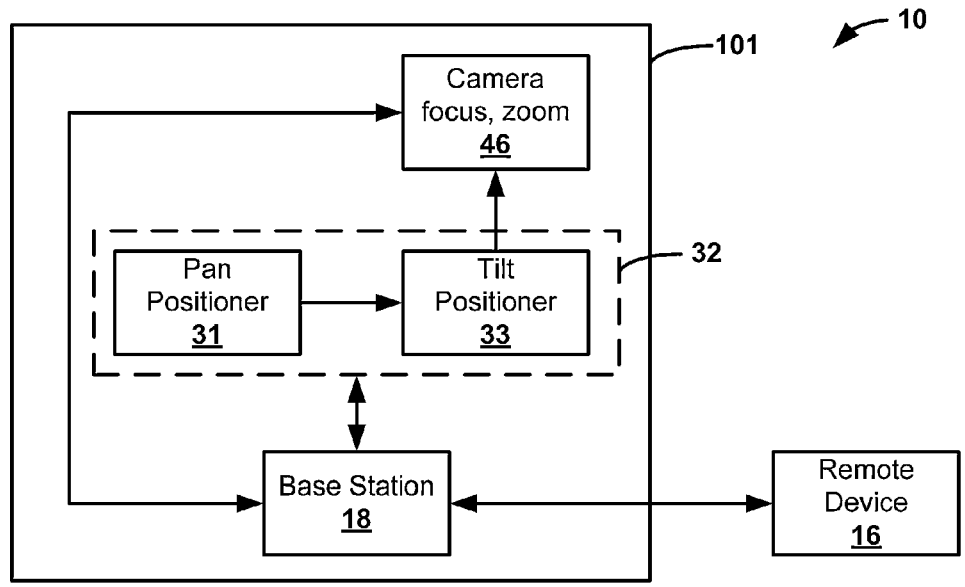
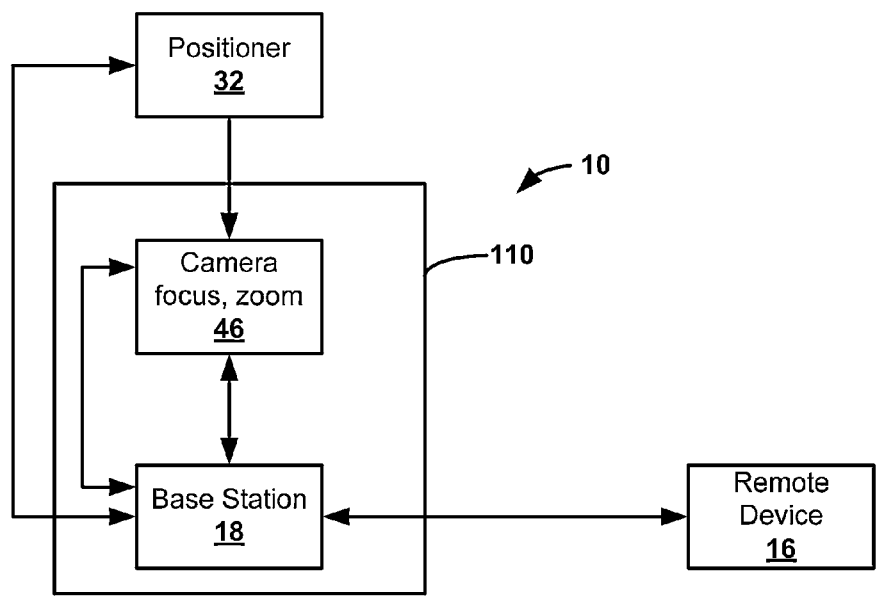

FIG. 12
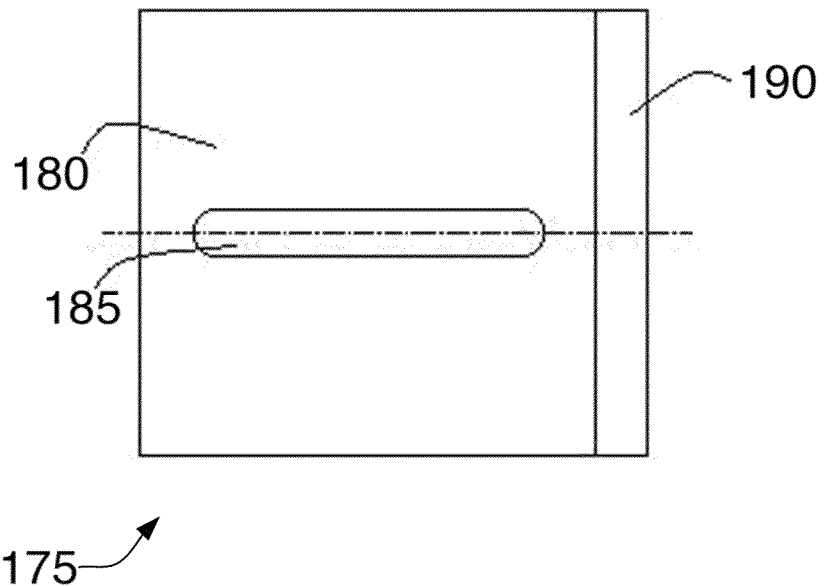
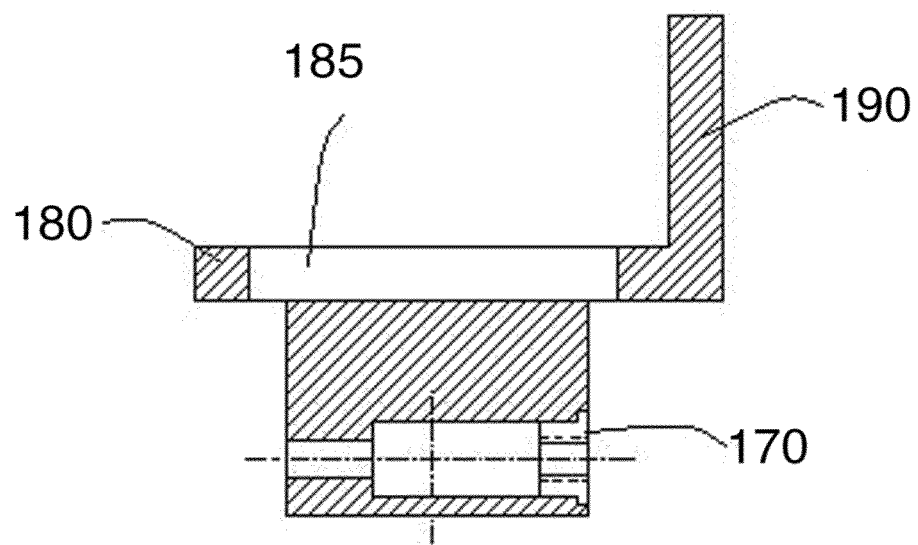

FIG. 13
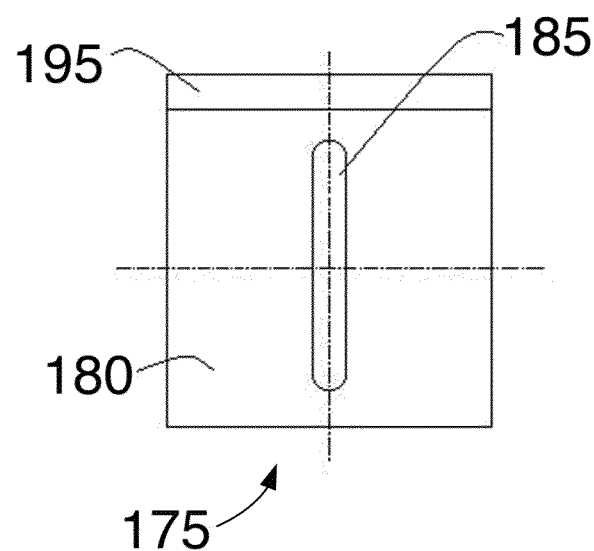
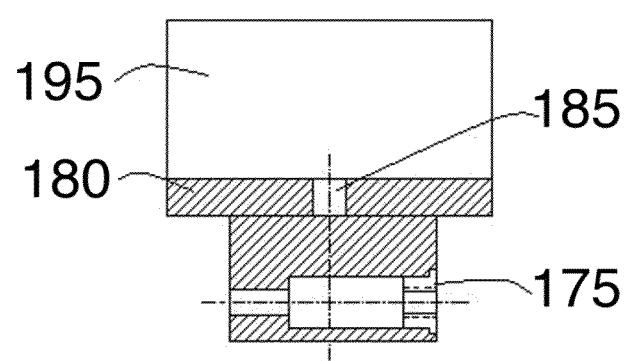

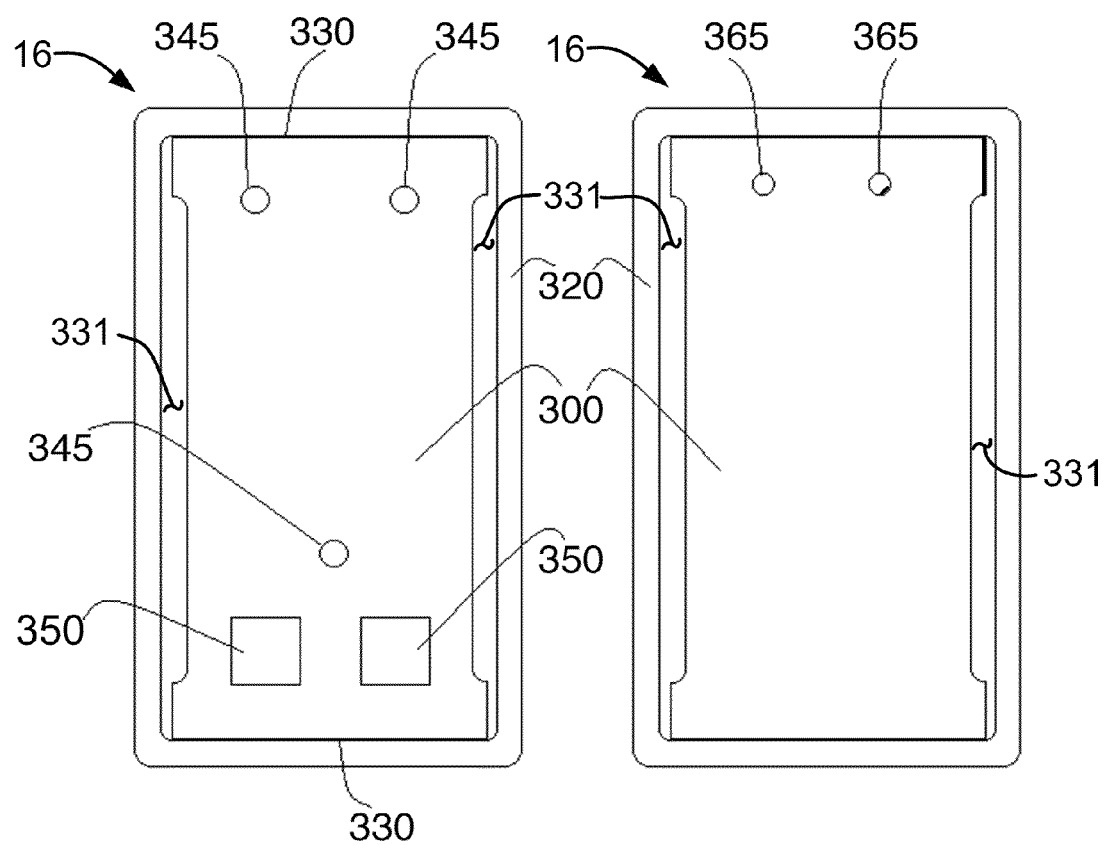

WATERPROOF ELECTRONIC DEVICE

CROSS-REFERENCE TO RELATED APPLICATIONS

This application claims the benefit of U.S. Provisional Patent Application No. 61/606,358, filed Mar. 2, 2012, titled "Waterproof Electronic Device"; U.S. Provisional Patent Application No. 61/606,975, filed Mar. 5, 2012, titled "Automated Video Recording System"; U.S. Provisional Patent Application No. 61/606,976, filed Mar. 5, 2012, titled "Zoom Control for Automated Video Recording"; U.S. Provisional Patent Application No. 61/606,981, filed Mar. 5, 2012, titled "Apparatus and Method for Mounting a Camera for Automated Video Recording"; U.S. Provisional Patent Application No. 61/607,549, filed Mar. 6, 2012, titled "Sound In Automated Video Recording"; and U.S. Provisional Patent Application No. 61/745,346, filed Dec. 21, 2012, titled "Self-Recording Systems"; the contents of all of which are hereby incorporated by reference in their entirety and are not admitted to be prior art with respect to the present invention by the mention in this cross-reference section.

BACKGROUND

Recording a person participating in an activity is an important task. A surfer may wish to capture his or her surfing experience for later enjoyment or to improve his or her surfing technique. A father may wish to record his son's winning touchdown in a football game. A mother may wish to capture her daughter's record-breaking gymnastics performance. In these examples, the camera is typically, and sometimes for best results, relatively far away from the participant, or more generally, the subject. To record the subject, a second person is needed to control and position the camera. Because humans are imperfect, the quality of the recorded video may not be ideal. For example, the camera operator or cameraman may have an unsteady hand making the recorded video too shaky and unbearable to watch. Additionally, the cameraman may become tired or distracted and may not keep the subject in the view field of the camera. In this situation, the cameraman may fail to capture an exciting or interesting moment. Further, some subjects may not have a second person willing to operate the camera. In this case, the individual loses the chance to record him or herself.

BRIEF DESCRIPTION OF THE DRAWINGS

FIG. 2 shows a block diagram illustrating an "all in one" embodiment of an automatic video recording system according to a preferred embodiment of the present invention.

FIG. 3 shows a block diagram illustrating a third embodiment of an automatic video recording system according to a preferred embodiment of the present invention.

FIG. 12 shows a top view and a corresponding cross-sectional view illustrating an alternate embodiment of a camera mounting platform according to a preferred embodiment of the present invention.

FIG. 13 shows a top view and a corresponding cross-sectional view illustrating another alternate embodiment of a camera mounting platform according to a preferred embodiment of the present invention.

FIGS. 17A-B shows a front view and a rear view illustrating a remote device according to a preferred embodiment of the present invention.

DETAILED DESCRIPTION OF THE PREFERRED EMBODIMENTS

Figure 1:
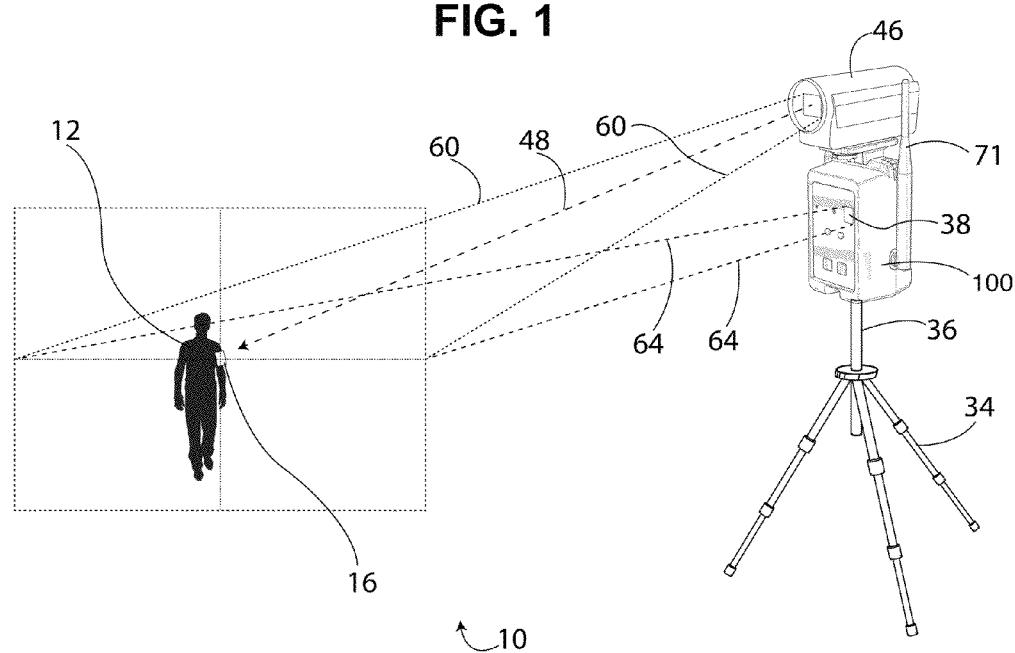
FIG. 1 shows a schematic diagram illustrating an automatic video recording system according to a preferred embodiment of the present invention.

The present invention relates to an automatic video recording system that tracks the movements of a freely moving subject (or target) and records the subject without the aid of a cameraman. The tracking of the subject and the control of the recording device (the camera) is based on computing the angle of orientation and the distance between the camera and the subject. The locations that are needed for the calculation of the angle of orientation may be determined by a variety of methods that may be used individually or in various combinations; such methods will be collectively referred to herein as Location Determination Technology. According to the present invention, camera movements in general and zoom and/or focus changes in particular are based on target size data and movement data regarding the camera and the filmed target. Movement data comprise location data supplemented by the time derivatives of location data (e.g., the target's velocity and acceleration). Also, the knowledge that location data are missing or are insufficiently well defined is treated as additional data.

Systems and methods of obtaining and utilizing location data for controlling a camera to track a subject have been described in co-owned and co-pending U.S. patent application Ser. No. 13/726,222, titled "System and Method for Initial Setup of an Automatic Recording System", U.S. patent application Ser. No. 13/726,355, titled "Automatic Orientation of a Pointing Device Using a Single Global Positioning Unit", U.S. patent application Ser. No. 13/726,451, titled "Feedback and Manual Remote Control System and Method for Automatic Video Recording", U.S. patent application Ser. No. 13/726,380, titled "A Portable System for Automated Video Recording", and U.S. patent application Ser. No. 13/726,203 "A Portable System for High Quality Automated Video Recording", the contents of all of which are hereby incorporated by reference herein in their entirety.

The systems hereof generally comprise two substantially separate units: a remote device that is located and moves together with the subject of the recording and a portable but substantially stationary unit that executes the functions of a positioning device and a recording device (e.g., a camera). In various preferred embodiments hereof, these functions may be carried out by separate units or by integrated units. Coupling of the recording device function with the positioning device function is one important aspect of the present invention.

At least one intended application of the systems hereof is to record sporting events during which the remote device (together with the subject) may be exposed to harsh conditions, such as being temporarily submerged in water or hit against hard objects. In that regard, one of the objectives of the systems hereof is to make the remote device waterproof and shockproof. Further, since the remote device is located with the subject, recording of sound at the location of the subject is an important feature hereof.

FIG. 1 shows a schematic diagram illustrating an automatic video recording system according to a preferred embodiment of the present invention. FIG. 1 shows a preferred embodiment of automatic video recording system 10. In such a preferred embodiment, camera 46 is mounted on top of orientation controller 100. Orientation controller 100 is mounted on mast 36 of tripod 34, as shown. Mast 36 is preferably height adjustable.

Automatic video recording system 10 is portable so that it may be taken to and set up at the recording venue. Automated video recording system 10 is configured to track subject 12 associated with remote device 16 as subject 12 moves freely in the environment. In the preferred embodiment shown in FIG. 1, orientation controller 100 pans camera 46 such that camera 46 points at subject 12 and remains pointed at subject 12 as he or she moves. It is noted that subject 12 may also be an animal or an object. The tilt angle of camera 46 is preferably adjustable and set when setting up camera 46 and automatic video recording system 10. Accordingly, the camera axis (the axis of the lens, or lens system, of camera 46) points in the direction of pointing vector 48 between camera 46 and subject 12. Strictly speaking, camera 46 points in the direction of remote device 16. This is, in part, due to communication between orientation controller 100 and remote device 16. Orientation controller 100 preferably comprises antenna 71, as shown. Antenna 71 serves to facilitate communication with remote device 16.

To assist in the discussion hereof, reference should be made to co-owned and co-pending U.S. patent application Ser. No. 13/726,203, titled "A Portable System for High Quality Automated Video Recording" (hereinafter referred to as the '203 patent Application), and co-owned and co-pending patent application Ser. No. 13/726,222, titled "System and Method for Initial Setup of an Automatic Recording System" (hereinafter referred to as the '222 patent Application); such patent applications incorporated by reference above.

In the preferred embodiment shown in FIG. 1, the zoom of camera 46 is preferably adjusted so that subject 12 is entirely within field of view 60 of camera 46. Optionally, a light source, namely, light emitting diode 38, illuminates field of view 60 giving subject 12 feedback regarding whether or not camera 46 is appropriately oriented at subject 12. The light source beam is depicted as beam 64.

The components of automatic video recording system 10 may be configured and integrated in a number of different ways.

FIG. 2 shows a block diagram illustrating an "all in one" embodiment of an automatic video recording system according to a preferred embodiment of the present invention. In FIG. 2, automatic video recording system 10 comprises camera 46, positioner 32, base station 18, and remote device 16, as shown. Positioner 32 comprises pan positioner 31 and tilt positioner 33, as shown. In automatic video recording system 10, camera 46, pan positioner 31, tilt positioner 33, and base station 18 are unitarily integrated into housing 101.

The automatic video recording system of FIG. 2 differs from the one shown in FIG. 1 in that, in FIG. 1, camera 46 is separated from pan positioner 31, tilt positioner 33, and base station 18 (which are unitarily integrated in orientation controller 100).

Referring to FIG. 2, housing 101 is preferably mountable on a tripod or any appropriate base that will hold the unit steady. Base station 18 communicates with remote device 16. In a preferred embodiment, the communication between base station 18 and remote device 16 is by two-way radio communication and the current location of remote device 16, determined using location determination technology, is sent to base station 18.

Base station 18 communicates with and commands pan positioner 31 and tilt positioner 33 based on information sent to base station 18 from remote device 16. For comparison purposes, the automatic video recording system shown in FIG. 1 preferably comprises a manually adjustable tilt which is settable for a given recording session. The output commands from base station 18 comprise voltage signals that represent the necessary pan and tilt angles and angular velocities to pan and tilt housing 105. Such commands are preferably based on a procedure that provides smooth and efficient positioning of housing 105 and integrated camera 46 to generate high quality video. Additionally, focus and zoom commands are sent from base station 18 to camera 46, as shown. The focus and zoom commands are based on the computed distance between base station 18 and remote device 16. The focus and zoom commands are also preferably based on the size and velocity of movement of the subject being recorded. As illustrated in FIG. 2, pan positioner 31 preferably turns tilt positioner 33, and with it, camera 46. Tilt positioner 33 preferably tilts camera 46. Pan positioner 31 and tilt positioner 33 preferably send data about their current orientation (and that of camera 46) to base station 18.

At least one advantage of the automatic video recording system of FIG. 2 includes the ability to have well-defined information about the orientation of camera 46 with respect to pan positioners 31 and tilt positioner 33. When setting up the automatic video recording system of FIG. 1, the user must carefully mount camera 46 on orientation controller 100 with a well-defined orientation. With the unitary integration of the components of automatic video recording system of FIG. 2, it is possible to know the orientation of camera 46 with higher precision and higher certainty compared with the camera of the automatic video recording system of FIG. 1. The automatic video recording system of FIG. 1 is advantageous in that it permits use of a wide variety of existing cameras as recording devices.

The automatic video recording system shown in FIG. 2 is further advantageous in that camera 46 may be adjusted to have the correct zoom and focus during a recording session. Cameras are commonly equipped with an automatic focus feature; however, such an automatic focus feature focuses on any object or person that may pass in front of the camera (i.e., between camera 46 and subject 12). During sporting activities, a host of people and/or objects may pass between the camera and the desired recording subject. A typical camera will adjust the focus when such people or objects pass between the camera and the desired recording subject creating an undesired result. For example, when filming a surfer, a camera with an automatic focus feature enabled may incorrectly change the focal distance based on waves or other surfers. In the case of a soccer game, other players or spectators between the camera and a subject player may cause unintended change in focus. The automatic video recording system of FIG. 2 provides a way to control the zoom and focus of the integrated camera to avoid the above-noted problems.

When recording automatically, a delay is present between the movement of subject 12 and movement of camera 46. This delay is mostly attributed to the time required for the automatic video recording systems hereof to detect movement of remote device 16. Additionally, time is required for remote device 16 to communicate with base station 18, to compute the desired camera direction and the corresponding commands for the positioners, and lastly to actually turn camera 46. As a result of this delay, subject 12 may be outside of the center of field of view of camera 46, particularly when subject 12 moves rapidly. As a result, the automatic focus feature of a typical camera may not work properly. Base station 18 of the automatic video recording system of FIG. 2 preferably computes the distance between camera 46 and remote device 16 and adjusts the focus of camera 46 so that subject 12 remains in focus. In addition, the automatic video recording system of FIG. 2 recognizes whether or not subject 12 is close to the edge of the frame of the camera. Such recognition is based on the distance between camera 46 and subject 12 and is further based on the velocity of subject 12. Accordingly, when the subject is close to the edge of the frame of the camera, base station 18 commands camera 46 to zoom out. Additionally, camera 46 may be directed to zoom out when the subject's location becomes unknown or uncertain. This may occur if, for example, the subject is a surfer and he or she is temporarily underneath the surface of the water or behind a wave, if the velocity of the subject is excessive, or if the communication between remote device 16 and base station 18 is temporarily interrupted. When circumstances change, camera 46 preferably zooms in to record a more detailed picture of subject 12.

It is noted that the automatic video recording system of FIG. 2 may also be used alone without remote device 16 as a stand-alone camera. In such a case, the automatic video recording system may be operated in a hand-held manner, attached to a tripod, or attached to a sporting or other device (e.g., a bicycle, a surfboard, etc.) for point-of-view recording. With the embodiment illustrated in FIG. 2, a parent at a child's soccer game would be able to pause the automatic recording and tracking of the child in the field and operate the automatic video recording system to take pictures or footage of another player that is not being tracked with remote device 16.

FIG. 3 shows a block diagram illustrating a third embodiment of an automatic video recording system according to a preferred embodiment of the present invention. In the embodiment of automatic video recording system 10, camera 46 is unitarily integrated with base station 18 into housing 110. Housing 110 does not include the pan and tilt drive mechanisms unitarily integrated into housing 110 thus making it lighter in weight. Such a weight difference is advantageous for point-of-view filming applications. In use, the automatic video recording system of FIG. 3 is preferably connected to positioner 32 to track a subject associated with remote device 16. Housing 110 must be designed and built in such a way that the camera axis points at a fixed direction with respect to positioner 32 when housing 110 is connected to positioner 32.

Figure 4:
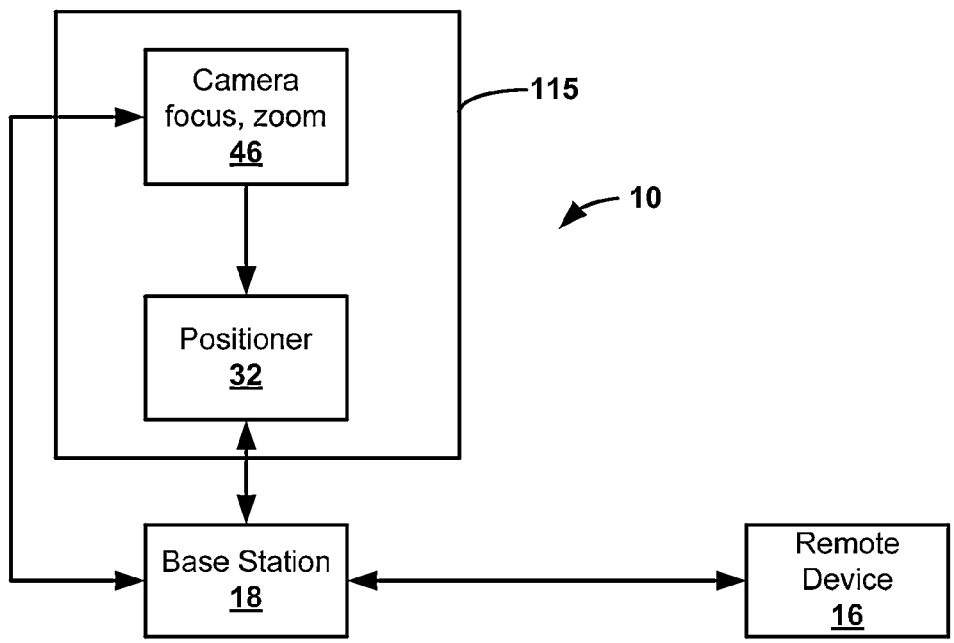
FIG. 4 shows a block diagram illustrating a fourth embodiment of an automatic video recording system according to a preferred embodiment of the present invention.

FIG. 4 shows a block diagram illustrating a fourth embodiment of an automatic video recording system according to a preferred embodiment of the present invention. The automatic video recording system of FIG. 4 comprises camera 46 and positioner 32 (preferably incorporating pan and tilt features) unitarily integrated in housing 115. Base station 18 is communicatively coupled to camera 46 and positioner 32, as shown. Base station 18 controls camera 46 and positioner 32. At least one advantage of the configuration of the automatic video recording system of FIG. 4 is that the camera orientation is fixed with respect to positioner 32. Additionally advantageous, since base station 18 is physically separated from housing 115, a single base station may be configured to control other cameras and positioners of separate units.

According to one preferred embodiment of the present invention, a single subject with one remote device may be filmed by a plurality of cameras from different angles and/or at different locations. For example, housing 115 integrating camera 46 and positioner 32 may be positioned at different locations (e.g., multiple locations along a soccer field or down a ski slope). In such an application, a single base station controls all of the cameras configured to track the remote device.

According to another preferred embodiment hereof, multiple subjects with distinct remote devices may be filmed using multiple cameras wherein the multiple cameras are controlled by a single base station. In embodiments that comprise a plurality of the camera/positioner units shown in FIG. 4, the base station receives and stores information regarding the locations of each camera/positioner unit as well as the locations of each remote device. Such an embodiment would be beneficial to operation of a resort, a theme park, etc. Additionally, a sports coach of a team sport would benefit from such a system as the coach would be able to generate video footage for each player.

Figure 5:
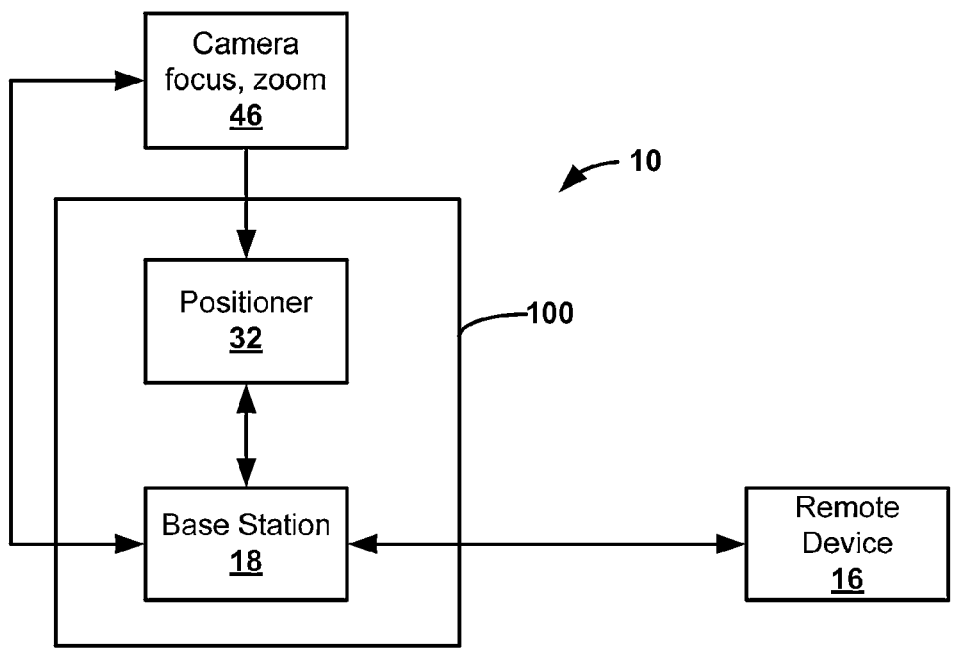
FIG. 5 shows a block diagram illustrating a fifth embodiment of an automatic video recording system according to a preferred embodiment of the present invention.

FIG. 5 shows a block diagram illustrating a fifth embodiment of an automatic video recording system according to a preferred embodiment of the present invention. The automatic video recording system of FIG. 5 comprises base station 18 integrated and positioner 32 unitarily integrated into housing 100. At least one advantage of the automatic video recording system of FIG. 5 is flexibility of use with a wide variety of cameras. The automatic video recording system of FIG. 5 must be designed and built in such a way that essentially any connected camera is properly aligned with housing 100 so that the axis of the camera points at a fixed and known direction with respect to housing 100. The automatic video recording system of FIG. 5 may further comprise a motorized pan positioner and a tilt positioner that is manually adjustable. Such an embodiment is useful for applications where maintaining a constant tilt is desired.

Figure 6:
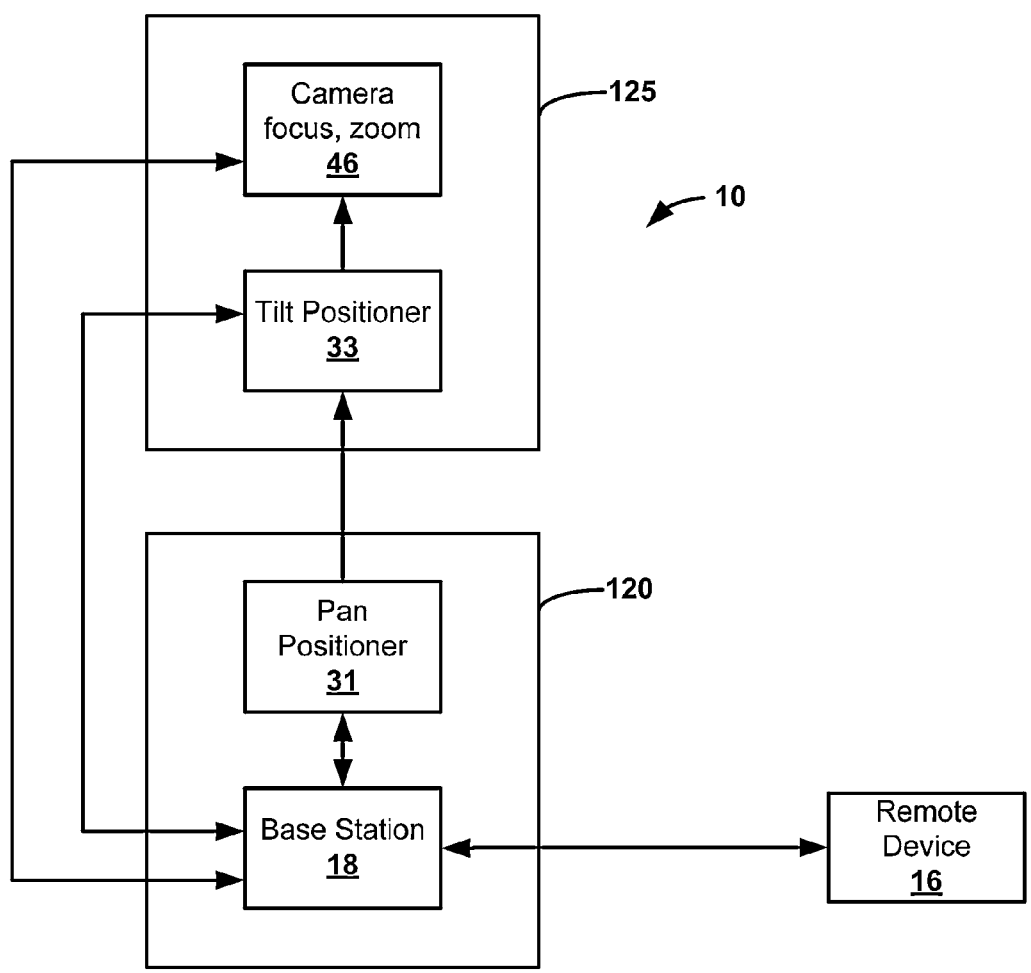
FIG. 6 shows a block diagram illustrating a sixth embodiment of an automatic video recording system according to a preferred embodiment of the present invention.

FIG. 6 shows a block diagram illustrating a sixth embodiment of an automatic video recording system according to a preferred embodiment of the present invention. In the automatic video recording system of FIG. 6, pan positioner 31 and tilt positioner 33 are housed separately. Base station 18 and pan positioner 31 are unitarily integrated in housing 120. Tilt positioner 33 and camera 46 are unitarily integrated in housing 120. In some applications, if the movements of a subject are able to be tracked by pan movement alone (e.g., if there is very little movement in vertical direction), one may choose to use housing 120 as a panning device and attach a camera to it. Specialized embodiments for some sporting activities (e.g., bungee jumping) may need an automatic tilt positioner 133 integrated with camera 46. Separating the components as in the automatic video recording system of FIG. 6 provides end users with flexibility to purchase devices with only the features (e.g., automatic panning or automatic tilt) the end user desires.

When describing the pan and tilt movements, it is noted that their sequence (order) is reversible as long as both positioners are in operation. However, if one of the positioners is absent, differences in the resulting video footage will be observed. If a constant tilt is combined with automatic panning, the camera motion will be different if the pan positioner moves around a substantially vertical axis compared with a tilted axis. In the case of a substantially vertical axis, the camera will track horizontal motion of a subject at a particular altitude. In the case where the panning device is tilted, the camera will track motion that has a minimum or maximum altitude in the direction that is within the plane of the tilt.

Figure 7:
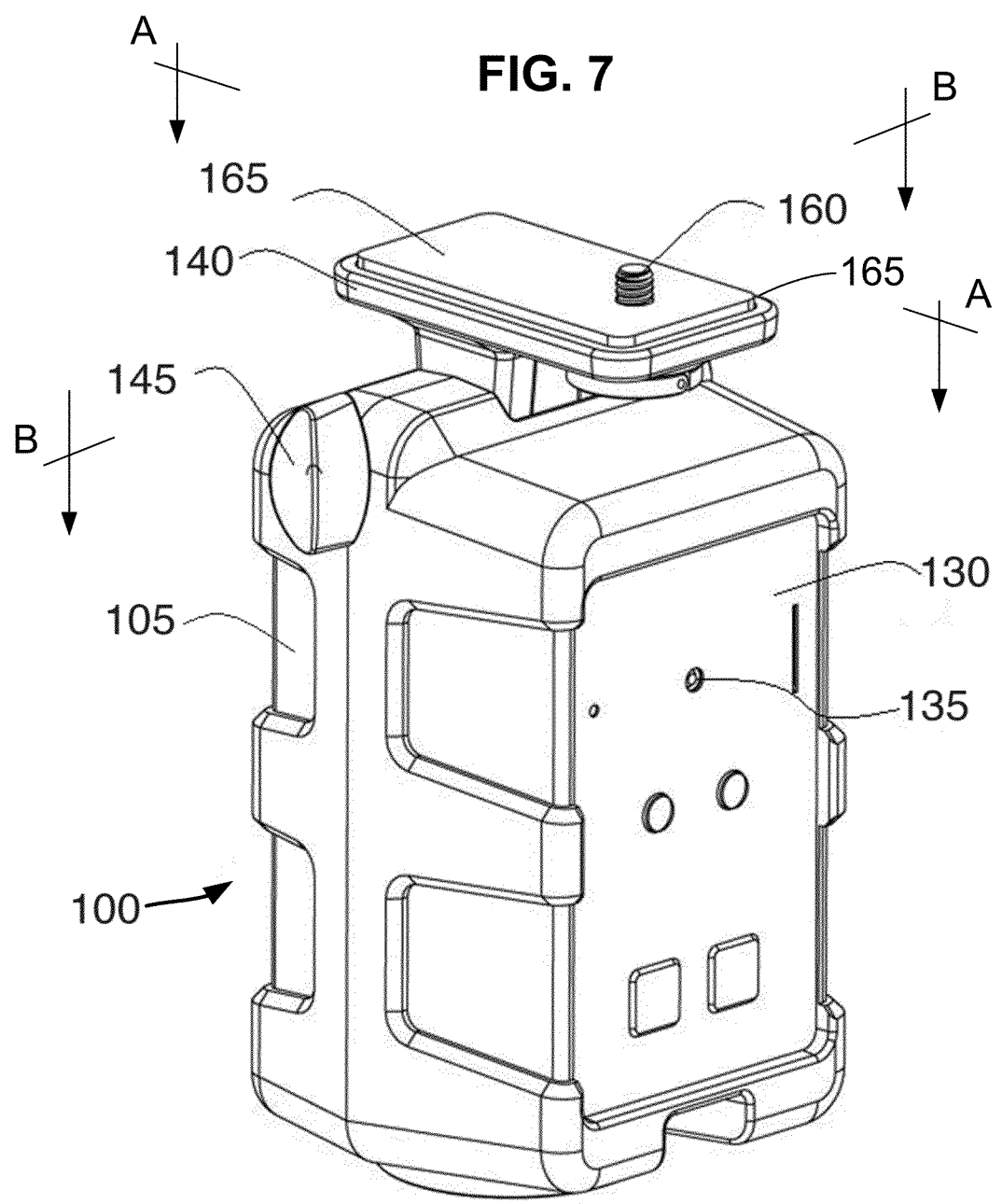
FIG. 7 shows a close up perspective view of a preferred embodiment of the orientation controller of FIG. 1.

FIG. 7 shows a close up perspective view of a preferred embodiment of the orientation controller of FIG. 1. FIG. 7 shows front panel 130 of orientation controller 100. Front panel 130 preferably comprises light source 135, as shown. Orientation controller 100 preferably comprises mounting platform 140, as shown. Mounting platform 140 is attached to housing 105 of orientation controller 100 by means of bolt 145. Bolt 145 is preferably a wing-type bolt. The end of bolt 145 preferably provides sufficient gripping surface to turn bolt 145. Mounting platform 140 may be tilted by turning bolt 145.

Mounting platform 140 is preferably equipped with mounting pad 165 and mounting screw 160 to attach a camera to mounting platform 140. Mounting screw 160 is preferably of the type connectable to most cameras. Although most cameras have standard mounting threads, some cameras may have different mounting features or none at all. Non-standard cameras may be connected to mounting platform 140 using adapters configured to interface the camera or other device to mounting platform 140.

Mounting pad 165 of mounting platform 140 is a preferably a high friction pad designed to prevent a connected camera from moving with respect to the platform after mounting screw 160 is tightened. Mounting pad 165 is preferably made of soft silicone. Before securing the camera to mounting platform 140 using camera mounting screw 160, the user should check that camera is aligned appropriately. The camera is aligned with orientation controller 100 if the optical axis of the camera is perpendicular to front panel 130 when the camera is not tilted and tilting the camera moves its optical axis within a plane that is perpendicular to the front panel 130. The user may check for appropriate alignment with an alignment feature of mounting platform 140. A preferred embodiment of the alignment feature is edge 705 of the preferably rectangular-shaped mounting platform 140 that is parallel to the facing orientation of front panel 130. Alignment of the camera with this edge may be done by visual alignment. Depending on the shape of the camera, it is noted that the front and back edges of mounting platform 140 may be used to align the camera appropriately.

Figure 8:
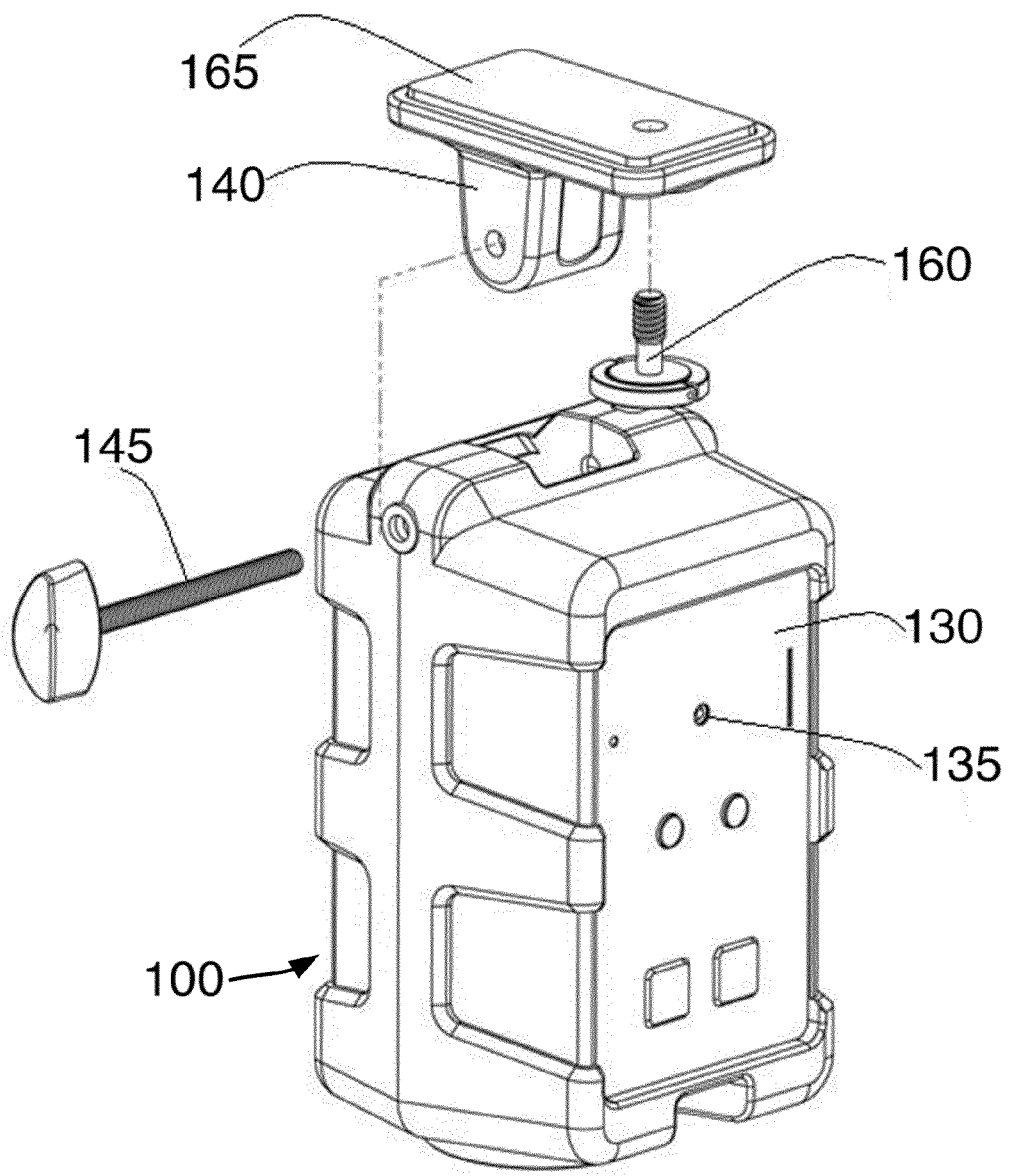
FIG. 8 shows an exploded view illustrating the mounting platform of the orientation controller of FIG. 7.

FIG. 8 shows an exploded view illustrating the mounting platform of the orientation controller of FIG. 7.

Figure 9:
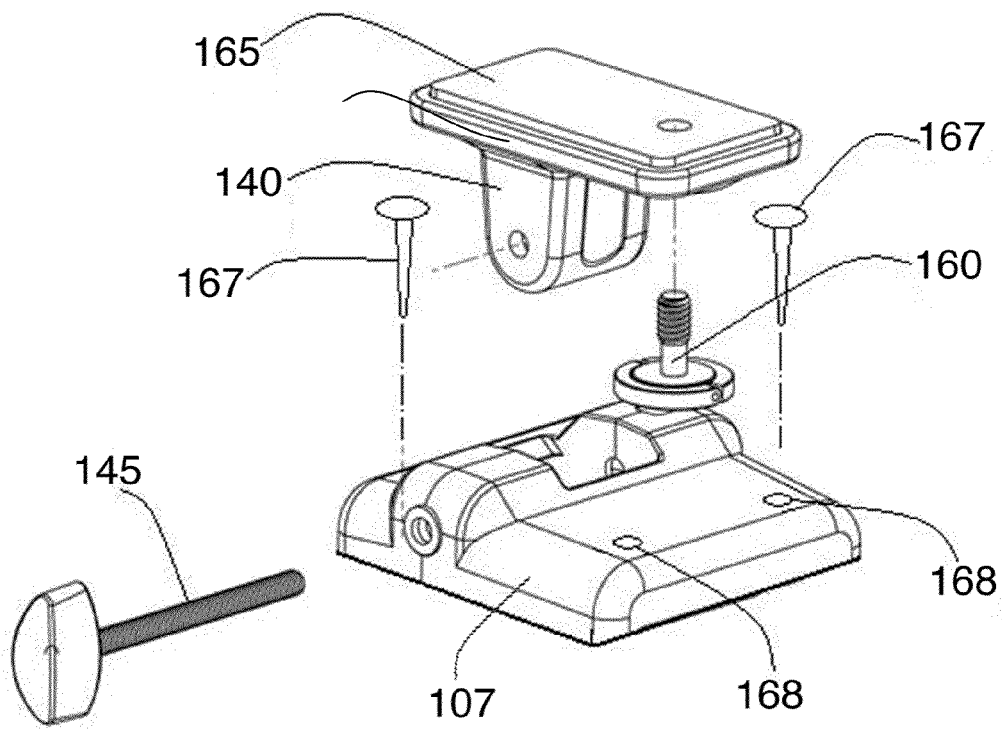
FIG. 9 shows an exploded view of an alternate embodiment of an upper portion of the orientation controller of FIG. 1.

FIG. 9 shows an exploded view of an alternate embodiment of an upper portion of the orientation controller of FIG. 1. In FIG. 9, orientation controller comprises cap 107 that is separable from the bottom portion of orientation controller 100 (not shown). Mounting platform 140 is mounted onto cap 107. Fasteners 167 fasten cap 107 to the bottom portion of orientation controller 100. Preferably four fasteners are used to fasten cap 107 to the bottom portion of orientation controller 100. To avoid overcrowding of FIG. 9 only two of the preferably four fasteners 167 are shown. It should be noted that other numbers of fasteners may suffice so long as cap 107 is securely connected.

Each fastener preferably passes through an aperture 168 in cap 107. The positioning of apertures 168 assists in aligning cap 107 with the bottom portion of orientation controller 100. The alignment of cap 107 with the bottom portion of orientation controller 100 is important as discussed above. Other geometric features, such as groove-ridge pairs or alignment pins, may also be used in the fastening of cap 107 with the bottom portion of orientation controller 100.

Figure 10:
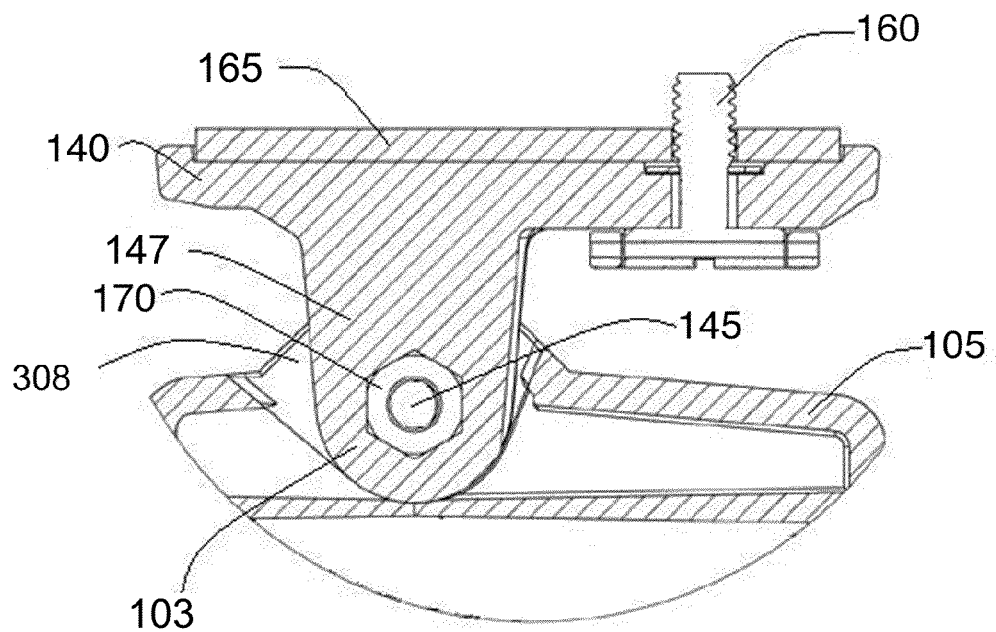
FIG. 10 shows a cross sectional view through the section A-A of FIG. 7.
Figure 11:
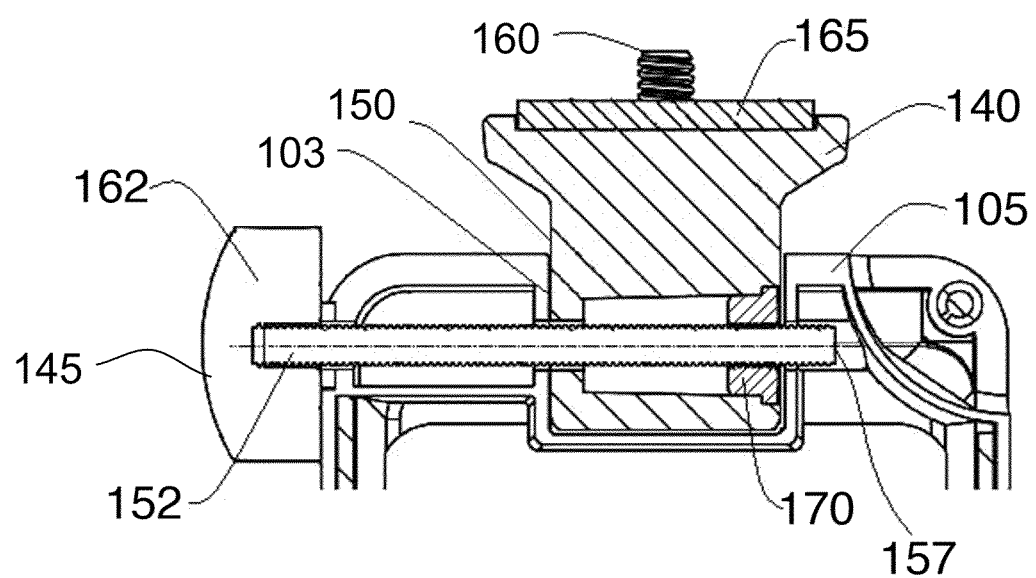
FIG. 11 shows a cross sectional view through the section B-B of FIG. 7.

FIG. 10 shows a cross sectional view through the section A-A of FIG. 7. FIG. 11 shows a cross sectional view through the section B-B of FIG. 7.

Bolt 145 passes through an opening in bottom portion of mounting platform 140, as shown. Nut 170 secures bolt 145, as shown. Bolt 145 assists in securing mounting platform 140 to housing 105. Additionally, mounting platform 140 may be tilted about the longitudinal axis of bolt 145.

Bolt 145 preferably comprises threaded shaft 152. Threaded shaft 152 preferably extends only about four fifths of the width of the assembly. Nut 170 is preferably set in the internal surface of the housing engaging portion 147 of mounting platform 140, as shown. Thus, only one pair of surfaces (surface 150 of mounting platform 140 and surface 103 of housing 105) are secured and held against each other when bolt 145 is tightened, as shown in FIG. 11. With nut 170 internally set, only a single component, bolt 145, need be removed when disassembling mounting platform 140 from housing 105. This is advantageous at least for the reason that the systems hereof are intended for outdoor use where small parts (washers, nuts and the like) may easily get lost.

In one preferred embodiment, threaded rod portion 152 and gripping portion 162 of bolt 145 are separable. In such an embodiment, gripping portion 162 may have a rectangular opening that fits a matching rectangular end portion of threaded rod portion 152. Gripping portion 162 and threaded rod portion 152 preferably fit together via a male-female connection. After assembly, the user may simply remove gripping portion 162 from threaded rod portion 152. Removing gripping portion 162 provides a theft deterrent as a potential thief would need a tool with a matching geometry to loosen or to remove threaded portion to access camera mounting screw 160 that secures the camera 46 to mounting platform 140.

In a preferred embodiment, threaded rod portion 152 and gripping portion 162 are permanently affixed to each other and unitary. After bolt 145 is connected with mounting platform 140 using nut 170, end portion 157 of bolt 145 is preferably altered during assembly so that bolt 145 cannot be completely unscrewed and removed. This prevents separation of the components of the assembly shown in FIG. 10 and FIG. 11, and potential loss of parts.

One important feature of the embodiment shown in FIG. 10 and FIG. 11 is that vertical planar surface 103 of the upper portion 105 of housing of orientation controller 100 is perpendicular to front panel 130 (see FIG. 8). Additionally, vertical planar surface 150 of the lower portion 147 of mounting platform 140 is perpendicular to longitudinal axis of bolt 145. This feature ensures that, as long as camera 46 is mounted and secured on mounting platform 140 with the correct orientation, the orientation of camera 46 with respect to orientation controller 100 will be properly oriented. Thus, it is very important to correctly mount camera 46 on mounting platform 140. Camera 46 is placed onto mounting platform 140 and secured using camera mounting screw 160 such that camera 46 points in a direction perpendicular to front panel 130. It is important to make sure that the camera direction with respect to orientation controller 100 is preserved during the recording session. This is achieved with the assistance of mounting pad 165 which is preferably made of a compressible and high-friction material, for example silicon rubber. After camera mounting screw 160 is secured, the camera direction will remain steady as the camera is moved by orientation controller 100.

Mounting camera 46 requires care and is aided by the rectangular shape of mounting platform 140. In a preferred embodiment, the long side of rectangular-shaped mounting platform 140 is parallel to the intended direction of the camera axis. This long side aids visual alignment of camera 46 on mounting platform 140. However, it is also possible to use a square geometry for mounting platform 140 or the shorter side of the rectangular geometry so long as the side used to align the camera is parallel to the intended direction of the camera axis.

The size of the rectangular shaped mounting platform 140 is preferably large enough to provide sufficient surface area to support a video camera. For example, a 30 millimeter by 60 millimeter rectangular top may be used; however, other sizes may suffice. Larger support areas may be necessary if mounting heavier or bulkier cameras Additional alignment features, such as grooves, or markings that aid the visual alignment of the camera may also be present.

In another embodiment, the precision of the mounting direction of the camera is improved by an optical setup procedure. Once the camera is mounted such that alignment is visually correct as described above, the user directs the camera at a flat vertical surface like a wall and turns on light source 135 shown in FIG. 8. The light beam from light source 135 is perpendicular to the front panel 130. The user observes the spot of light from light source 135 on the vertical surface through the camera and adjusts the alignment of the camera 46 on mounting platform 140 such that visible light appears in the center of the frame. The user may change the zoom of camera 46 and observe the movement of the light spot, if any. If camera 46 is oriented properly, the light will not move within the frame while zooming, although it will appear smaller or larger or sharper or more diffuse. If the light spot moves to the side of the frame, the camera axis is not parallel with the light beam from light source 135 and camera 46 needs to be adjusted. The procedure is repeated until the user is satisfied that the camera 46 is mounted correctly.

FIG. 12 shows a top view and a corresponding cross-sectional view illustrating an alternate embodiment of a camera mounting platform according to a preferred embodiment of the present invention. FIG. 13 shows a top view and a corresponding cross-sectional view illustrating another alternate embodiment of a camera mounting platform according to a preferred embodiment of the present invention.

FIG. 12 shows camera mounting platform 175 (which replaces camera mounting platform 140). Camera mounting platform 175 is attached to housing 105 (see FIG. 8) in the same manner as camera mounting platform 140 is attached. Camera mounting platform 175 preferably comprises side panel 190 as shown in FIG. 12 or back panel 195 as shown in FIG. 13. The camera is secured onto horizontal surface 180 using camera mounting screw 160 shown in FIGS. 8-11. The mounting platform shown in FIG. 12 is designed to permit mounting of cameras that have elongated shapes substantially along the optical axis of the camera and have at least one flat side that is parallel to the optical axis of the camera. Opening 185 permits passage of camera mounting screw 160. Opening 185 is elongated to accommodate mounting a wide range of camera types having various widths. In FIG. 12, mounting camera 46 such that it abuts side panel 190 ensures that the camera axis is aligned properly.

For cameras that have an elongated shape substantially perpendicular to their optical axis, and a substantially flat back side perpendicular to the camera axis, the platform shown in FIG. 13 is preferably used. Opening 185 permits passage of mounting screw 160 and is elongated to accommodate a range of camera thicknesses. If the back of the mounted camera abuts back panel 195 of platform 175, proper alignment of the mounted camera is achieved.

It is noted that in some embodiments the tilt feature of the camera mounting platform may be omitted. In such embodiment, the camera mounting platform may be made with a constant tilt or with no tilt at all.

Remote device 16 is an important component of all embodiments of the automatic video recording system of the present invention. Remote device 16 helps to orient camera 46 at subject 12 either by detecting its own location or by aiding base station 18 (see, e.g., FIG. 2) to detect the location of subject 12 associated with remote device 16. These tasks require that remote device 16 have a variety of input and output functions. In addition, it is desirable that the remote device 16 provide information about the status of the automatic video recording system, user feedback, and remote control of the system. User feedback and remote control features of remote device 16 are preferably implemented in multiple ways (e.g., light and sound signals, push-button, touch screen, or voice input, etc.). Since remote device 16 is typically carried by subject 12 in an outdoor environment, remote device 16 is preferably waterproof and shockproof.

Figure 14:
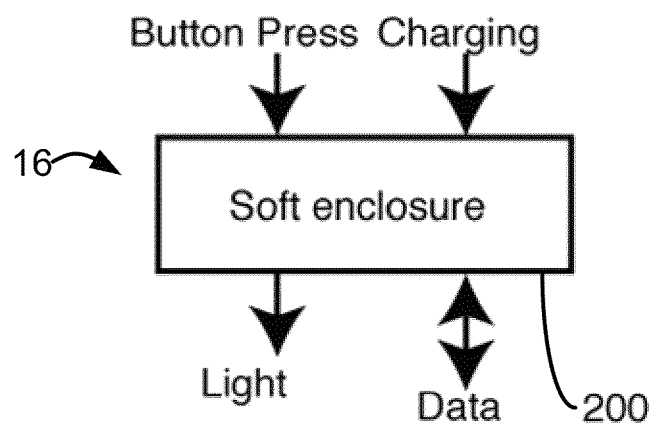
FIG. 14 shows a schematic diagram illustrating a first embodiment of a remote device according to a preferred embodiment of the present invention.
Figure 15:
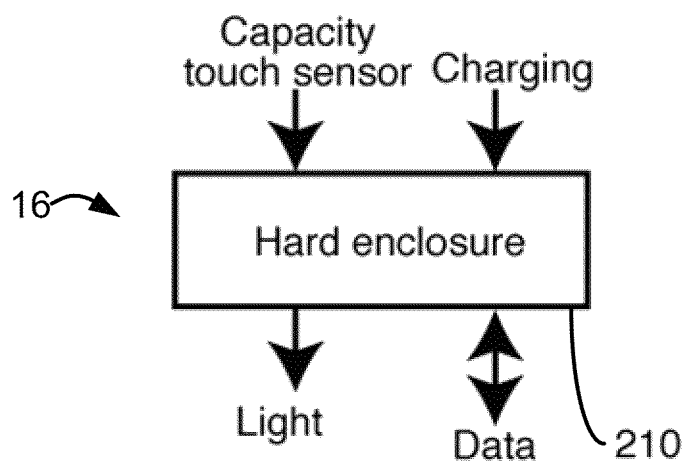
FIG. 15 shows a schematic diagram illustrating a second embodiment of a remote device according to a preferred embodiment of the present invention.

FIG. 14 shows a schematic diagram illustrating a first embodiment of a remote device according to a preferred embodiment of the present invention. FIG. 15 shows a schematic diagram illustrating a second embodiment of a remote device according to a preferred embodiment of the present invention. FIG. 14 and FIG. 15 show the major input and output connections enabled in preferred embodiments of the remote device.

FIG. 14 shows a first embodiment of remote device 16 comprising soft enclosure 200. FIG. 15 shows a second embodiment of remote device 16 with hard enclosure 210. Both embodiments preferably enable input by radio and electrical data and output by radio, light, and data communication. Additionally, both embodiments preferably enable charging of an associated battery. The enclosures (soft enclosure 200 and hard enclosure 210) are both preferably completely closed polymer enclosures. An important feature of both embodiments is that the completely closed polymer enclosures have high electrical resistance so that the enclosures do not short the enclosed electrical circuits that are essential for the operation of remote device. The polymers used also preferably have low damping characteristics for radio waves. Additionally, the polymer used preferably has low thermal conductivity. For circuits that dissipate significant energy, the low thermal conductivity may be problematic. This problem is solved in part by electrical design measures and in part by using composite polymers that have both high electrical resistance and moderate thermal conductivity. For example, some silicone based composite materials have 1.5-7 W/mK heat conductivity (for comparison: the heat conductivity of polyurethane is about 0.02 W/mK, while the heat conductivity of steel is 16-45 W/mK), while at the same time they can have over $10^{14}$ Ohm·cm specific resistance.

Data transfer may be implemented either by radio transceivers, or by a design similar to that described below in the context of battery charging. The difference is that, instead of charging stubs for battery charging, an array of data wire contacts is exposed. These contacts may be similar to those used in memory cards referred to as secure digital cards or SD cards. The contacts are preferably protected from shorting in water by an internal circuitry.

At least one difference between the embodiments shown in FIG. 14 and FIG. 15 is that switches that are covered by a thin layer of the soft polymer enclosure may be operated by the fingers of a user. The hard enclosure is advantageous in that it makes better waterproof enclosures around large hard elements, such as, for example, touchscreens.

In preferred embodiments of remote device 16 having hard enclosure 210 and further comprising a touchscreen, the on/off function is implemented by capacitive touch sensors that are always on. For example, a two area sensor has to be touched for at least five seconds simultaneously at both areas in order to turn the device on or off.

Figure 16A:
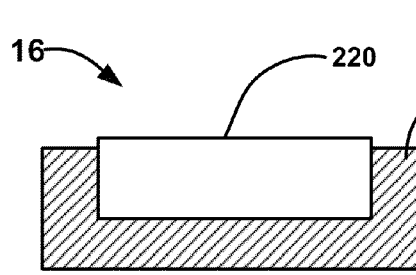
FIGS. 16A-D show schematic cross-sectional diagrams illustrating four embodiment variations of the remote device according to a preferred embodiment of the present invention.
Figure 16B:
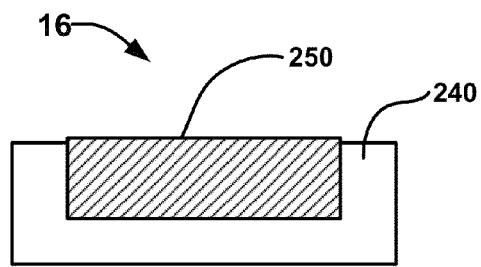

FIGS. 16A-D show schematic cross-sectional diagrams illustrating four embodiment variations of the remote device according to a preferred embodiment of the present invention. The embodiments of remote device 16 illustrated in FIGS. 16A-D show embodiment variations where soft and hard enclosures are used in various combinations. In FIG. 16A, remote device 16 comprises the electrical and electromechanical components of remote device 16 embedded in soft enclosure 220 which is embedded in hard enclosure 230, as shown. In FIG. 16B, remote device 16 comprises the electrical and electromechanical components of remote device 16 embedded in hard enclosure 250 which is embedded in soft enclosure 240.

Figure 16C:
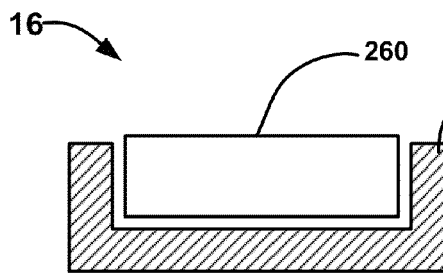
Figure 16D:
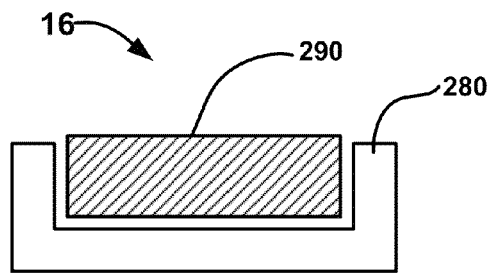

The embodiment of FIGS. 16C and 16D are constructed by entirely embedding the electronic and electromechanical components in soft enclosure 260 or hard enclosure 290 and providing a second separable part, hard enclosure 270 or soft enclosure 280, as shown.

The embodiment shown in FIG. 16C is shockproof since soft polymer 260 is embedded in the outer hard enclosure 270 which provides mechanical protection of the soft enclosure 260. Additionally, the use of outer hard enclosure 270 allows for attaching the device, for example, to a strap or a belt. A specific example of this preferred design version is shown in FIG. 17A and FIG. 17B.

FIGS. 17A-B shows a front view and a rear view illustrating a remote device according to a preferred embodiment of the present invention. The remote device of FIG. 17A is a specific example of an electronic device made with a waterproof and shockproof enclosure according to a preferred embodiment of the present invention. FIG. 17A shows the front of remote device 16; FIG. 17B shoes the rear of remote device 16.

The visible parts of remote device 16 include soft polyurethane mold 300 that completely encapsulates the electronic and electromechanical components of remote device 16 with the only exceptions being ends 345 of acrylic light pipes and ends 365 of stainless steel charging stubs. Soft polyurethane mold 300 is tightly fit into the hard preferably injection molded ABS plastic frame 320 at fitting surfaces 330. There is a gap 331 between mold 300 and frame 320; this gap may be used to put a strap through it, wherein the strap may be used to attach the device to the subject's body, or to sporting equipment, or the like. Microswitches embedded inside soft polyurethane mold 300 are slightly elevated and visible as elevated surface 350 of the mold surface.

The material selection for mold 300 is soft polyurethane; however, appropriate alternatives may be substituted. The soft polyurethane mold 300 or any substitute material should have a high water contact angle and be hydrophobic. Materials with water contact angles around or above 100 degrees are preferred as water repellent materials. The mechanical properties (hardness in the 40 Shore A to 10 Shore A range) of soft polyurethane are excellent; other plastics with similar properties may be used as well.

A preferred material for frame 320 is ABS plastic (hardness above 75 Shore A); other similar materials could be as well. When soft and hard molds are used in combination, as shown in FIG. 16A and FIG. 16B, hard polyurethane is the preferred choice for the hard enclosure. In the embodiment shown in FIG. 16A, the front part of the remote device is soft, but the backside of the device is a hard polyurethane. Frame 320 is omitted in the embodiment of FIG. 16A because its functions may be integrated in to the hard polyurethane portion. For electronics used during water sport activities, use of light materials, such as plastics, is preferred; however, for some applications metals could be used as well.

The design for remote device 16 shown in FIGS. 17A and 17B is preferred for electronics that could be worn attached to the arm or to the ankle of, for example, a surfer. A strap or band is passed through the gaps present between soft polyurethane mold 300 and frame 320. Even though the example shown in the drawings is specific to a remote device of an automatic video recording system, the principles disclosed herein are applicable to a wide range of electronics.

In the preferred design shown in FIG. 17A and FIG. 17B, mold 300 is tightly fit in frame 320. For improved security of the attachment of frame 320, frame 320 is preferably designed with "lips", slight elevations at the front and back edges of surfaces 330. To assemble mold 300 with frame 320, one takes advantage of the compressibility of the soft polyurethane of mold 300. Alternatively, mold 300 and frame 320 may be bonded together permanently using a glue, or solvent bonding. A tongue and groove feature may additionally be employed to assist the bonding. In a similar manner one can use the meniscus of an open topped mold as the compressed spring that allows a tight fit between the molded core and the injection molded frame.

Figure 18:
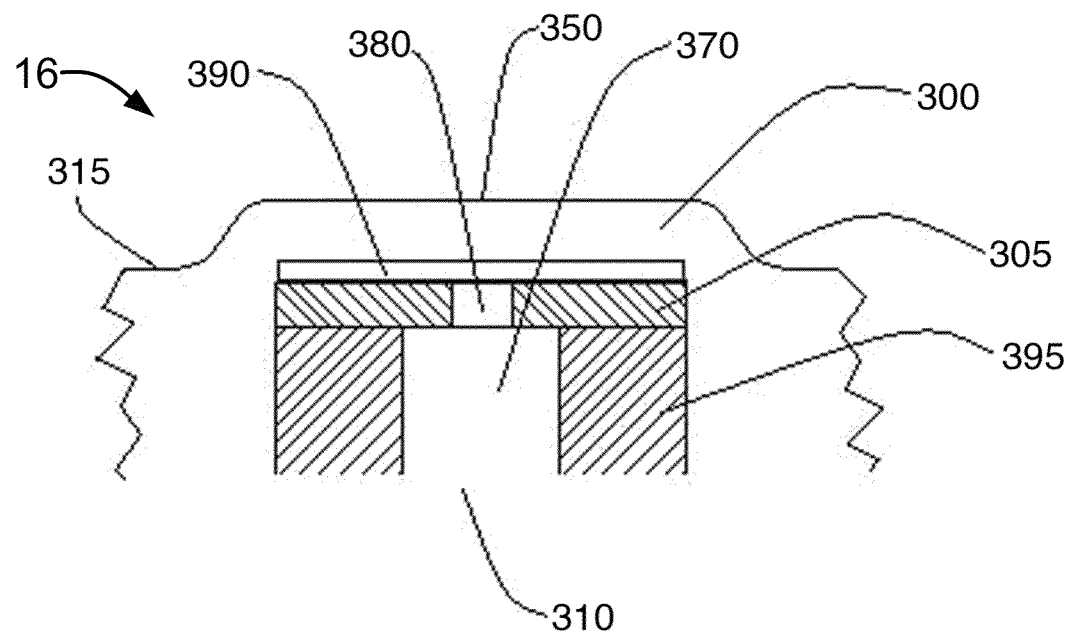
FIG. 18 shows a cross sectional view illustrating a microswitch embedded in remote device according to a preferred embodiment of the present invention.

FIG. 18 shows a cross sectional view illustrating a microswitch embedded in remote device according to a preferred embodiment of the present invention. In the embodiment of FIG. 18, remote device 16 preferably employs microswitches and similar devices set fully inside soft polyurethane mold 300. The upper part 370 of an exemplary microswitch 310 is shown within soft polyurethane mold 300. Button 380 of microswitch 310 is its closest part to elevated polyurethane surface 350 above it. The upper part 370 of microswitch 310 is preferably set in a closed cell foam portion 395 shaped in the form of a hollow cylinder. A second, washer-shaped closed cell foam portion 305 is positioned next to button 380. The closed cell foam portions 305 and 395 are used to separate button 380 of microswitch 310 from mold 300 so that movement of button 380 is unimpeded. The closed cell foam material is preferred for ease of manufacture and compressibility; however, any highly compressible material that causes little or no friction between button 380 and closed cell foam portion 305 may be suitably employed. A thin flexible sheet 390 closes the assembly. The top of microswitch button 380 is located close (about one to about four millimeters) to the molding level that forms surface 315 of the front of remote device 16. As a result, the mold is slightly elevated in the area of the microswitch and the resulting elevated surface 350 is clearly distinguishable for the user. The mold thickness range of about one to about four millimeters allows convenient handling of the microswitch 310. The closed cell foam material may be used as described above or it may be molded.

It is important for the user of an electronic device, such as remote device 16, to be informed about the status of the device or a device with which the electronic device communicates. One preferred way to provide such information is with light emitting diodes (LEDs) or similar devices. It is possible to have an LED embedded in mold 300 close to surface 315. If mold 300 is translucent, as many polyurethanes are, the LED light will be visible, although muted.

Figure 19:
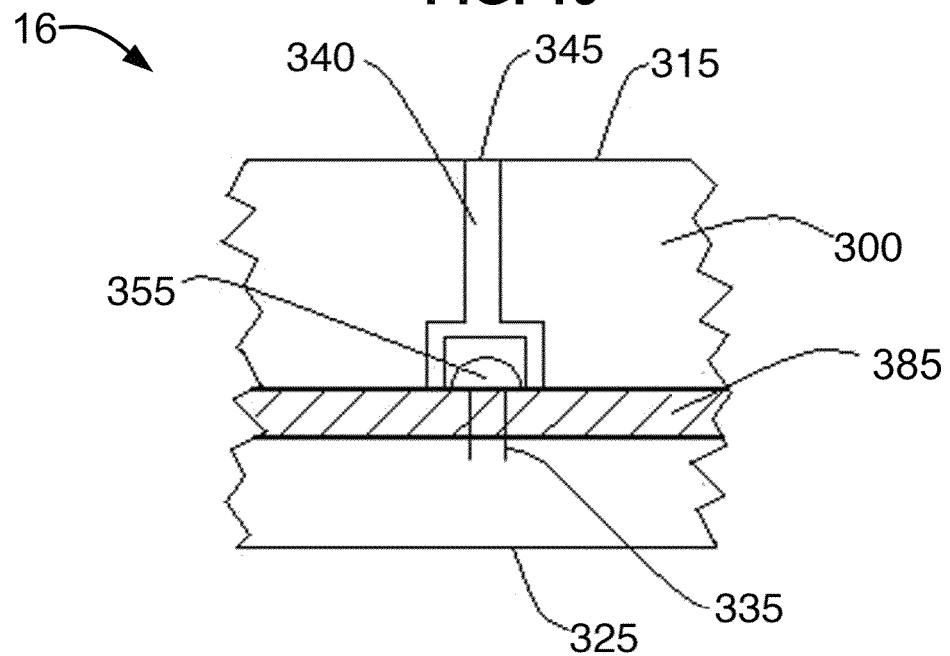
FIG. 19 shows a cross sectional view illustrating an embedded light source with a light pipe in a remote device according to a preferred embodiment of the present invention.

FIG. 19 shows a cross sectional view illustrating an embedded light source with a light pipe in a remote device according to a preferred embodiment of the present invention. FIG. 19 shows LED 355 set in printed circuit board 385 and pointing toward top surface 315. LED leads 335 are preferably soldered to printed circuit board 385 on the reverse side of printed circuit board 385. Light pipe 340 is set on top of the LED 355, as shown. Mold 300 completely encases printed circuit board 385. In a preferred embodiment, the molding is done such that front surface 315 is flush with the top 345 of light pipe 340. Light pipes for LEDs are made of various materials, such as optical grade acrylic, polycarbonate, or polybutylene. The light pipes may also be of different shapes. Preferably, the chosen material for light pipe has good adhesion to the mold and is hydrophobic. Light pipe 340 may also serve as a color filter. In an alternative embodiment, the top 345 of light pipe 340 has a domed shape. Such a preferred embodiment has the advantage of providing improved visibility of the LED light when viewed from the side.

Figure 20:
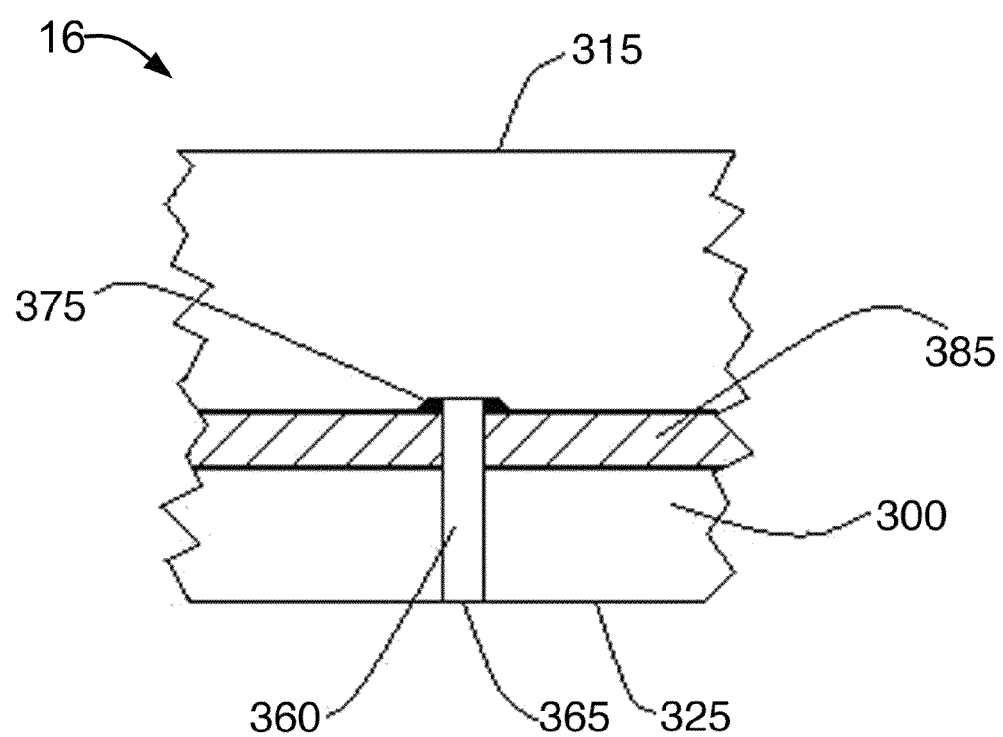
FIG. 20 shows a cross sectional view illustrating an embedded electrical connection post in a remote device according to a preferred embodiment of the present invention.

FIG. 20 shows a cross sectional view illustrating an embedded electrical connection post in a remote device according to a preferred embodiment of the present invention. More particularly, FIG. 20 shows charging stub 360 of remote device 16. Charging stub 360 is preferably made of a conductor that is soldered to a soldering rim on printed circuit board 385. The solder 375 can be on a single side of the printed circuit board 385, as shown, or on both sides of the board. In an alternate preferred embodiment charging stub 360 is press-fit into a rimmed hole on the printed circuit board 385 without soldering. Charging stub 360 is, with the exception of charging stub end 365, preferably completely surrounded by mold 300. End 365 of charging stub 360 is preferably flush with surface 325. End 365 of charging stub 360 interfaces with a charger (to charge a battery of remote device 16); the charger preferably connects to a standard household electrical outlet circuit.

Charging stub 360 is preferably made of a corrosion resistant material that has good adhesion to the mold material and is hydrophobic. One preferred example for the charging stub material is grade 304 stainless steel with electro-polished surfaces. Depending on material selection, the bonding of charging stub 360 to printed circuit board 385 may be executed using a welding process (for example, spot welding). If charging stub 360 is made of a metal that cannot be soldered, it may be coated with a coating, for example, zinc, facilitating soldering. In another preferred embodiment, charging stubs 360 are not soldered to printed circuit board 385 and a press-fit provides electric contact with charging stub 360.

In a preferred embodiment, the charger for remote device 16 is equipped with flat or convex-shaped magnetic charging pads for connecting to charging stubs 360. In one embodiment, charging stubs 360 are also magnetic and the magnetic force between the charging pads of the charger and charging stubs 360 holds the electronic device (remote device 16) and the charger together. In such an embodiment the magnetic force also prevents the electronic device from being connected incorrectly to the charger. In another preferred embodiment charging stubs 360 are ferromagnetic but not magnetized. The magnetic force between the magnetic charging pads of the charger and the ferromagnetic charging stubs 360 will ensure contact during charging; correct polarity is preferably ensured by mechanical design. In still another preferred embodiment charging stubs 360 are made of a nonmagnetic metal, such as copper, aluminum, brass, or nonmagnetic stainless steel. The electrical contact between the charging pads of the charger and the charging stubs is provided, for example, by springs or by magnetic forces between at least one magnet in the charger and one ferromagnetic plate, or magnet embedded within mold 300. The cylindrical geometry of charging stub 360 shown in FIG. 20 (and FIG. 17B, where end 365 is visible) is preferred for the charging stubs of remote devices of the automatic video recording systems; for other applications (for example for data contacts) other designs may be feasible.

In standard video recording sound is recorded by the video recorder itself. In the case of the automatic video recording systems of the present invention, this method of sound recording is often not optimal since the action being recorded is not in the vicinity of the camera and there is no cameraman to provide comment. Rather, subject 12 of the recording, i.e., the person with remote device 16 of automatic video recording system 10 (see FIG. 1) may wish to record comments. If the motors and gears of orientation controller 70 generate noise, camera 46 will record that noise. Furthermore, it may be likely that camera 46 of automatic video recording system 10 is in the vicinity of other persons disinterested with the recording and the camera may record their unrelated conversations or comments. For all these reasons it is desirable to replace the sound recorded by camera 46 with a soundtrack recorded by subject 12. This is accomplished by providing a voice-sensing device, such as a microphone, in remote device 16 located with the subject 12. In a preferred embodiment of the present invention, remote device 16 includes one or more voice or sound sensing devices. Further, remote device 16 may be capable of recording and storing sound electronically for later embedding in the corresponding video recorded or transmitting sound information for recording, storing, and/or syncing.

There is a significant advantage to empowering subject 12 to use remote device 16 for recording and transmitting voice commands to orientation controller 100. The use of voice commands may be much easier and efficient during physically demanding sporting activities than alternatives like pushbutton or touchscreen inputs.

Figure 25:
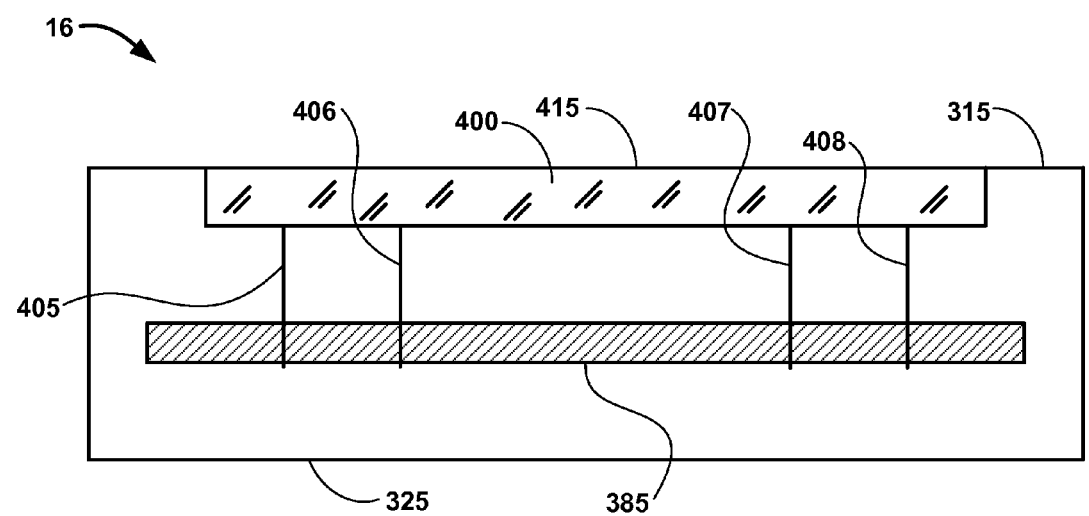
FIG. 25 shows a cross sectional view illustrating an embedded touchscreen in remote device according to a preferred embodiment of the present invention.

FIG. 25 shows a cross sectional view illustrating an embedded touchscreen 400 in remote device 16 according to a preferred embodiment of the present invention. Touchscreen 400 is embedded in remote device 16 at top surface 315, as shown. The exposed surface area of touchscreen 400 is the touchable surface area 415 of touchscreen 400, as shown. Printed circuit board 385 is shown connected to touchscreen by way of electrical connections (depicted as electrical connections 405, 406, 407, and 408). Other components, such as a battery or power source are not shown in the drawings for clarity.

Figure 21:
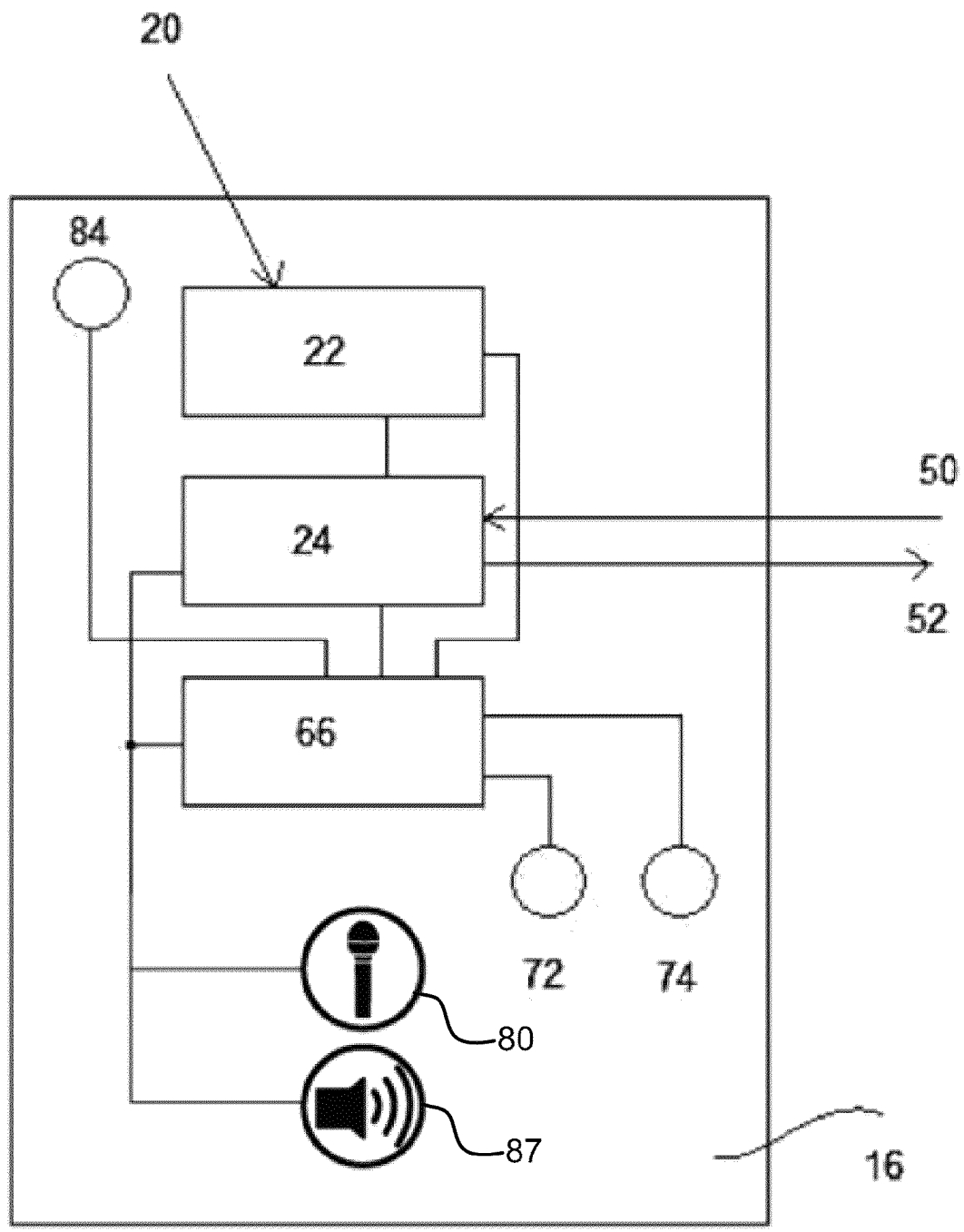
FIG. 21 shows a schematic diagram illustrating the main components of a remote device equipped with a microphone and speaker according to a preferred embodiment of the present invention.

FIG. 21 shows a schematic diagram illustrating the main components of a remote device equipped with a microphone and speaker according to a preferred embodiment of the present invention. The location of the remote device 16 is preferably determined by global positioning antenna 22 that receives satellite signals 20 (or equivalent terrestrial signals) from a positioning system. An example of such a positioning system is the Global Positioning System (GPS). Alternatively, other location determination technologies may be employed (in such embodiment some components of remote device 16 would be replaced with components that interfaced with the location determination system used). Data received by global positioning antenna 22 is communicated to a microcontroller/memory unit 66 and to a radio transceiver 24. Control buttons 72 and 74 are preferably included to power on and off remote device 16 and for other functions. A status indicator LED 84 preferably shows system readiness. A battery, charger contacts, and a charge indicator LED are other preferred components of remote device 16 but are not shown in FIG. 21. Remote device 16 preferably comprises microphone 80 and speaker 87, as shown.

Microphone 80 outputs electronic signals to microcontroller/memory unit 66 and to radio transceiver 24. Radio transceiver 24 is used for two-way communication (50 and 52) with base station 18 of automatic video recording system 10 shown more comprehensively in FIGS. 1-6 above. The two-way communication indicated by numbers 50 and 52 is preferably via radio waves. The radio transceivers in base station 18 and remote device 16 are preferably paired for each recording session. As a result of the pairing, the radio communication data packets are preferably preceded with an identifier code to avoid interference by unrelated transceivers operating in the same vicinity. In the embodiment shown in FIG. 21, the position data obtained with the aid of global positioning antenna 22 is transmitted to base station 18; base station 18 commands a positioner (or a multiplicity of positioners) to orient an associated camera in the direction of remote device 16. Remote device 16 is preferably easily transferable device so that, for example, one surfer can easily pass it to another. Camera 46 of automatic video recording system 10 tracks and records whoever has remote device 16.

In a preferred embodiment base station 18 can control "on/off", "record/stop recording", and other functions of camera 46. With this type of control, the target or subject of the recording may use the communication feature between remote device 16 and base station 18 to control various aspects of the recording. The control may be exercised by physically engaging a button switch or touch sensor or alternatively by voice. For example, a surfer can speak the word "RECORD" when he begins to paddle to a wave and speak "STOP" when he or she wishes to stop recording. This feature is advantageous in that it eliminates the need to watch hours of surfing video to find those portions where the subject is actually surfing (which may be only a few minutes long). In another embodiment, the user may send commands to the camera to take a burst of high quality still images.

In a preferred embodiment, sound is recorded at remote device 16 and transmitted to base station 18 and synchronized with the captured video. The audio information transmitted is discretized into audio information packets. Each audio information packet is time stamped and transmitted to base station 18. The base station 18 verifies that the audio information packet was not corrupted during transmission and communicates with remote device 16 that the audio information packet was received correctly. If the audio information packet was corrupted, base station 18 communicates to remote device 16 to resend the audio information packet which base station 18 has designated as being corrupted. The audio information packet is matched to the appropriate time in the recorded video using the timestamp information. This process repeats while automatic video recording system is operating. Base station 18 communicates with remote device 16 to verify that it has received all of the transmitted audio information packets. If any audio information packets were never received by base station 18, base station 18 communicates to the remote device which time periods are missing and the audio information packets corresponding to those timestamps are resent from remote device 16 to base station 18. While the above is described with respect to an automatic video recording system, this process can be applied to any application where audio information is captured by a device separated from a recording device.

In another preferred embodiment of the present invention, a copy of the recorded sound file is stored at remote device 16 in addition to transmitting audio information packets to base station 18. Storing recorded audio at remote device 16 is beneficial in that if the communication link between remote device 16 and base station 18 is compromised, the audio from remote device 16 may be used as a backup.

There are other functions of base station 18 that subject 12 may wish to control. For example, one could control positioner 32 to adjust or recalibrate the orientation of the camera 46 using remote device 16. Such control may be operated by pushing appropriate buttons or by interfacing with a touch screen embedded in remote device 16. Additionally, and highly preferably, such controls may be voice actuated so that the operation is hands free.

Positioner 32 is preferably designed to reduce the noise associated with the electronic and mechanical components that may produce undesired sound (e.g., motors, gearboxes, etc.). This is achieved through incorporating noise shielding, physical dampening, and/or noise absorbing material in positioner 32 or in camera orientation controller 100. These design measures may increase the cost and weight of the equipment but are useful if the sound is recorded by the camera 46. Providing a sound track recorded by subject 12 makes dealing with noise issues associated with the positioner or camera orientation controller less necessary. Nevertheless, sound sensing and recording by the camera 46 may be useful. For example, even if a cameraman is not needed to operate the camera, friends nearby the camera may wish to periodically comment on the recording.

It may also be useful to record sound by base station 18 as well if base station 18 it at a separate location (see, e.g., FIG. 4). In such an embodiment, several cameras and several remote devices may be controlled by a single base station. Base station 18 would be controlled by an operator who oversees recording by all cameras and who would add meaningful commentary to the recording. In a related embodiment, a person located at base station 18 may communicate to the tracked subject 12 through remote device 16. In this embodiment, base station 18 and remote device 16 preferably have one-way or two-way voice communication by radio.

According to a preferred embodiment hereof, remote device 16 is waterproof and shockproof. As described above, such waterproofing and shockproofing is achieved by embedding the components of the remote device in a polymer (with the exception of those surfaces that need to be exposed to provide electronic, electrical, or optical interfaces and touchscreens). In such an embodiment, the polymer has an inside surface and an outside surface. The inside surface is preferably in direct contact with the electronic and mechanical parts of the remote device unit. The outside surface of the polymer is part of the surface of the remote device and may serve in part as the cosmetic surface of the remote device. The outside surface of the remote device also includes surfaces of electrical or electronic contacts, surfaces of light pipes, lenses, and surfaces of screens, touchscreens, and the like. The outside surface can also include surfaces of microphones and speakers.

It should be noted that traditional waterproofing employs use of hard polymer shells or cases in which devices, like cameras, are encased. Because of the sound isolation properties of the air between such enclosures and the protected device, devices in such enclosures are not well suited for recording sound. At the same time, such hard enclosures generate sound by rustling against garments worn by the user and by bumping into other hard objects. By embedding the remote device in a soft polymer, for example, soft polyurethane, these problems are reduced or solved. Using a soft polymer improves shock resistance of the unit and reduces sound that may arise when the unit is bumped into a hard object. The embedding polymer reduces the propagation of locally generated sound such as that caused when a garment worn by the subject rustles against the body of the unit. These features are applicable to other sound recording devices. For example, sound recorded by microphones that may accompany or be otherwise incorporated with electronic devices, such as wearable, mountable cameras, can similarly be improved by embedding these electronic devices in polymers, particularly lower durometer polymers.

One example of an application using the principles of the present invention hereof includes filming a television show, such as a "reality" television show. The systems hereof may be used to film a scene in a crowded area without disturbing the scene (or without the expense of multiple camera crews). The reality television subject (or subjects) wears a remote tracking device having a microphone so that all footage and events are captured as they occur. Cameras may be set up at different angles and elevations to track a single subject or multiple subjects s or some combination thereof. Voice recordings may be time stamped to match them with the recorded images for later editing and production.

FIGS. 1-6 show automatic video recording system 10 which is configured to detect the location of and track subject 12, such as a participant in a sporting event. Automatic video recording system 10 preferably comprises remote device 16, preferably collocated with subject 12, base station 18, positioner 32, and camera 46. Base station 18 and remote device 16 preferably comprise microcontrollers and communication devices. Base station 18 determines a pointing vector 48 between camera 46 and remote device 16 based in part on sensor data obtained at the location of camera 46. For further details, reference should be made to the '203 patent Application incorporated by reference above. As subject 12 moves together with remote device 16, pointing vector 48 is updated and base station 18 determines any angular position change and any change of zoom and focus necessary to keep the subject 12 within frame 60 of camera 46. The zoom angle is defined by the lines 60.

Figure 22:
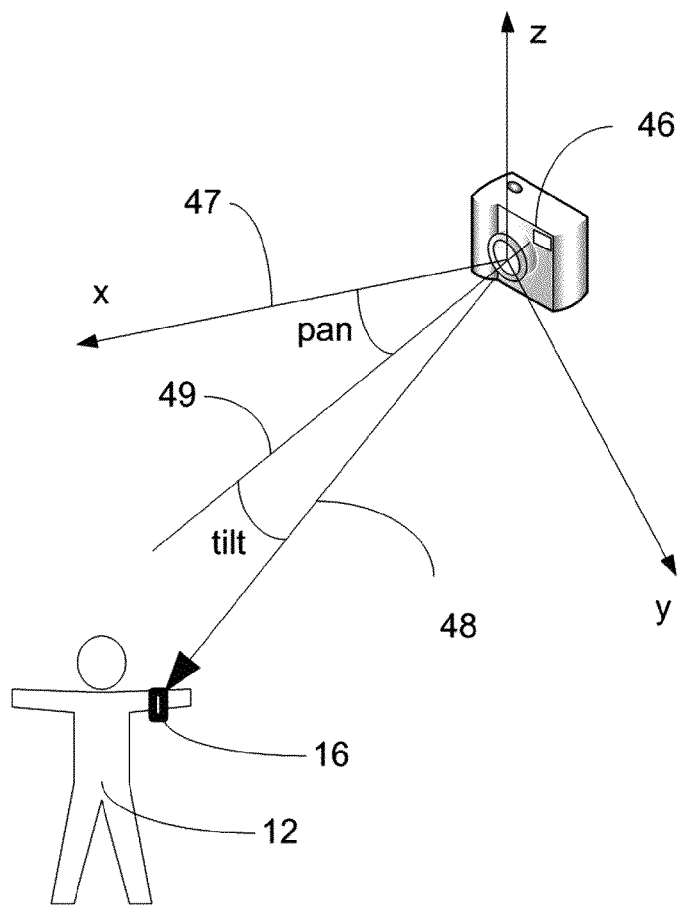
FIGS. 22 and 23 show schematic diagrams illustrating the relationship of various components of an automatic video recording system.
Figure 23:
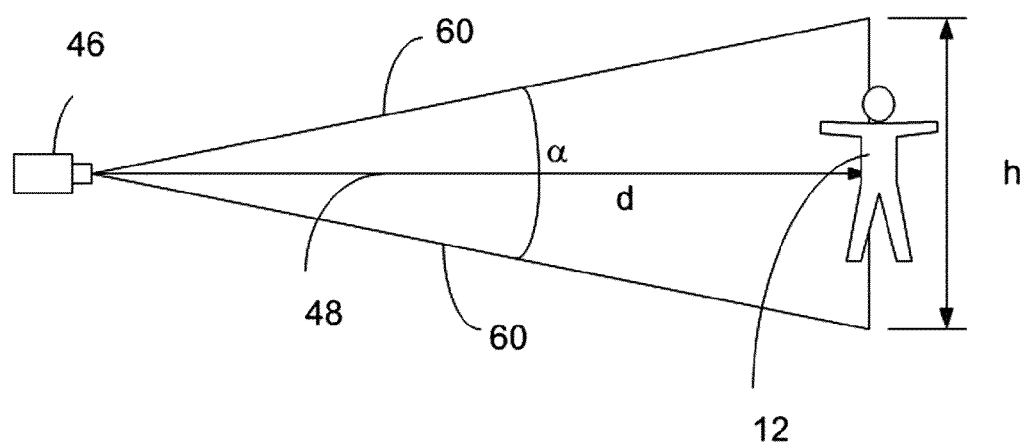

FIGS. 22 and 23 show schematic diagrams illustrating the relationship of various components of an automatic video recording system. More particularly, the orientation of pointing vector 48 may be described as an angular deviation from original pointing direction 47 of camera 46. In an earth fixed coordinate system centered at location of camera 46, an orientation angle may be thought of as a sum of a pan angle and a tilt angle. It is convenient to think about the earth fixed coordinate system as having the x axis along initial direction 47 of camera 46. The pan angle is in the xy plane of the coordinate system between directions 47 and 49. The tilt angle is between the directions 49 and 48, in a plane that is perpendicular to the xy plane.

Base station 18 outputs positioning commands to positioner 32 and camera operation commands to camera 46. Positioner 32 positions camera 46 to point along the relative position pointing vector 48 at remote device 16, and the zoom level of camera 46 is set such that the field of view of camera 46 is larger than subject 12. Further, the focal distance of camera 46 is controlled so that subject 12 is in focus. The choice of the optimal frame size is generally a compromise between the desire to zoom in as much as possible to show as much detail as possible while keeping subject 12 within the field of view without excessive rapid camera movements given any limitations of the location determining technology used. These limitations include limited precision and finite response speed.

Choosing optimal frame size may be accomplished in a variety of ways. In a preferred embodiment for creating videos, the default of automatic video recording system 10 is to record frames that are somewhat larger than human size. It is useful to provide user control for the desired zoom level. For example, for recording surfing sessions where large waves are present, a user may wish to have the entire wave in the field of view. In another preferred embodiment, for recording sporting applications with rapid movements, it is useful to record frames that are significantly larger than the human subject 12. In such applications, if the recording frame is too small with respect to the subject, the subject may get to the edge of the frame very quickly. The camera orientation is adjusted to track subject 12, and if the field of view is narrow, the camera orientation may have to be adjusted too rapidly for a pleasant viewing experience.

The zoom angle calculation is illustrated schematically in FIG. 23. Since the distance d between camera 46 and subject 12 is known by virtue of location determination technology, the zoom angle α between the lines of field of view 60 of camera 46 may be calculated for a field of view of size h. For example, if h=40 feet and the distance is d=400 feet, the zoom angle may be expressed as $$\alpha = 2\arctan\frac{h}{2d} \approx 5.7°.$$

In an embodiment where the automatic video recording system is intended for use in a variety of applications, it is advantageous to enable user input of a particular application type by choosing the estimated frame size or by inputting the size of the subject 12. For example, in a kite surfing application, one may want to zoom out to a wide angle that allows the kite, which can be 25 meters above the subject kite boarder, to be inside the frame.

It is also advantageous to zoom out when the accuracy of the location determination technology becomes questionable or the location determination technology signal is lost or is intermittent.

Figure 24:
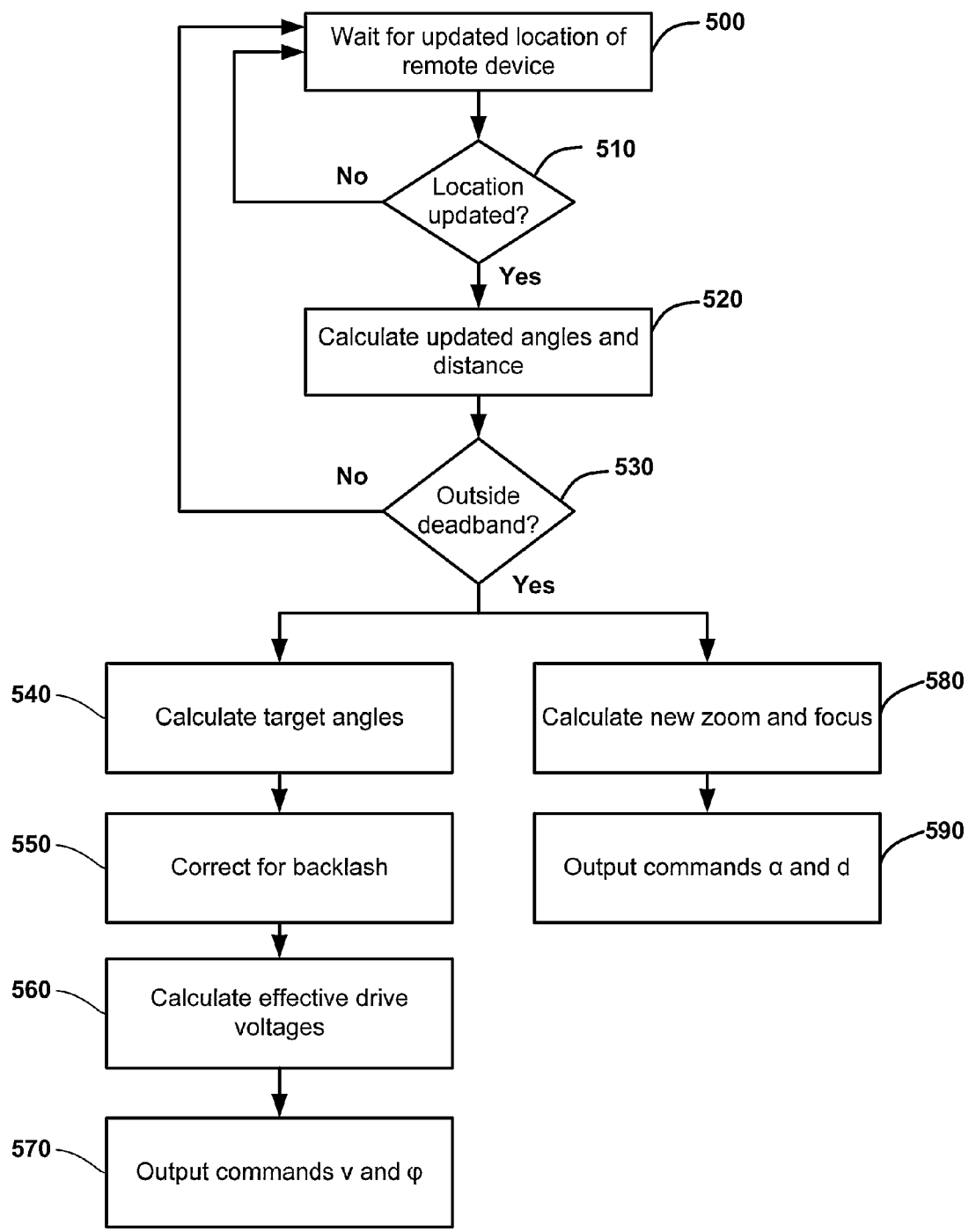
FIG. 24 shows a flowchart illustrating a method of operating an automatic video recording system with zoom and focus control according to a preferred embodiment of the present invention.

FIG. 24 shows a flowchart illustrating a method of operating an automatic video recording system with zoom and focus control according to a preferred embodiment of the present invention. Location determination technology generates location data of remote device 16 periodically several times each second. Base station 18 stores data about the location and current orientation of camera 46. A communication link between base station 18 and remote device 16 is present. During the continuing operation of the automatic video recording system an updated location of remote device 16 (target of the recording) is expected. Base station 18 of automatic video recording system 10 waits to receive an updated location of remote device 16 from the location determination technology used (step 500). When an updated location is received in step 510, updated values for the pan and tilt pointing angles and the distance between camera 46 and remote device 16 are determined in step 520. A deadband is preferably set meaning that the camera orientation and zoom will not be changed unless the change in the orientation and/or length of pointing vector 48 is outside of certain preset limits. A determination of whether the updated angles and distance of step 520 is outside of the deadband is performed in step 530. If the new location coordinates indicate that subject 12 has substantially moved (i.e., moved outside of the deadband), several events will occur. Target pointing angles are calculated in step 540. The target pointing angles are pan and tilt angles to which camera 46 will be moved based on the latest information received from the location determination technology. The target pointing angles are not the angles of the current camera orientation but rather the angles to which camera 46 would be turned if current movement of the subject 12 continues without change. The target pointing angles are modified by backlash compensation in step 550. For further details, reference is hereby made to the '203 patent Application referenced above. Effective drive voltages (for causing pan and tilt movements) are calculated in step 560. Commands based on the effective voltages are output in step 570. These voltages regulate both the pan and tilt turning angles, denoted by $\phi$, and the pan and tilt turning velocities, denoted by v. Simultaneously, zoom and focus are calculated for the new position of subject 12 in step 580. Commands for the new zoom angle $\alpha$ and new focal distance d are generated in step 590. The commands for the turning angle and turning velocity are outputs for positioner 32; the commands for zoom and focus are outputs for camera 46. The process of FIG. 24 is repeated every time a location update is generated in the remote device 16.

If step 500 waits too long, the output commands reorient and refocus camera 46 to the last detected position of subject 12. Here "too long" may be defined, for example, as missing two consecutive updates. Using this example, "too long" could be about 500 millisecond if the normal updating frequency is about five Hz. Base station 18 may be programmed to command camera 46 to zoom out until an update from location determination technology is received again. In step 520, the updated location coordinates of remote device 16 are recalculated in terms of angular orientation of the camera and in step 530 the difference of the updated and previous orientations is compared to a deadband in order to decide whether the change in the orientation warrants camera movement. As an example, if the angular change is less than about one degree, the camera does not move. This feature prevents unnecessary small movements. For example, if the subject is a speed skater and the remote device is attached to his arm, left-right arm swings would occur nearly every second. It would be very unpleasant to watch a video following these swings. If the subject moves outside of the deadband, a target camera angle is calculated in step 540; the angle calculated in step 520 is one input for the calculation in step 540.

At velocities that exceed a set limit, it is expected that the camera movement may lag substantially behind subject 12 and based on the last two or three or more angular positions a subsequent position may be predicted. This can be done using linear extrapolation from two data points, using least square fit linear extrapolation from more than two points, or using quadratic fit to at least three points, etc.; the result is a target angle. After the software corrects for backlash in step 550, effective driving voltages are computed in step 560. Proportional-integral-derivative methods may be applied in this step. In a preferred embodiment, the effective driving voltage is proportional to the difference between the target angle and current camera orientation, such that if the difference is large, the angular velocity of the camera movement is larger as well.

In a preferred embodiment, after the location update is received, the driving voltage is higher (and the camera movement is faster) if the angular change is greater and even faster if the camera orientation has been already lagging. The voltage is calculated as V=K*(target angle−camera angle), where K is a proportionality constant. V is updated frequently, for example, even as the target angle may be updated at about five Hz, V may be updated at about 200 Hz; the frequency of this updating depends on the frequency with which base station 18 receives updates from positioner 32 regarding the actual angular position of the camera 46. In the preferred embodiment of automatic video recording system 10, positioner 32 comprises one or more encoded wheel systems that generate the information regarding the actual angular position at any given moment.

If camera 46 gets close to the target angle, its movement slows down to avoid overshooting. In one preferred embodiment, the deadband is preferably recalculated when the subject moves past its boundary. Preferably, the deadband should move slower than the subject so that even moderate movement of the subject 12 in the direction of previous movement does move camera 46 but similar movement of the subject 12 in the reverse direction does not. This approach reduces unnecessary camera movements (i.e., the jitteriness of the recording) to a significant extent.

As an alternative to proportional-integral-derivative control, pulse width modulation may be applied either alone or in combination with adjusting the voltage. Other control approaches may be employed in different embodiments of the present invention depending on the type of motors used in positioner 32 to orient camera 46. For example, velocities of stepper motors may be controlled by adjusting the time interval between step or microstep commands. Open loop control, which eliminates the need for feedback such as from an encoded wheel, may be used by keeping track of step count and direction.

In step 550, the target angle is modified based on the known or estimated backlash of the driving motor and gearbox. In step 570, the effective voltage and target angle are output to the positioner as there are two command parameters regulating a motor (for example, a pan drive). In embodiments where multiple drives are used, each drive receives commands that result from similar processing.

In addition, in step 590, base station 18 sends drive signals directly to the camera so that the focus and zoom, and therefore the field of view, are adjusted depending on the distance between camera 46 and subject 12. Zoom is also adjusted depending on the velocity of the subject 12. At high velocities the automatic video recording system may not be able to keep the subject within the frame unless camera 46 zooms out (i.e., the frame is enlarged). The reason for this is related to the lag of camera positioning movement with respect to the movements of the subject 12 and also due to the deadband. In a constant velocity situation, where the effect of the deadband may be discounted, the lag is due mainly to the time delay of the location determination technology. Other factors that may cause delay include the finite updating frequency of the location determination technology, the finite processing speed of the electronics in base station 18, and the limited torque of the motors of the positioner 32 combined with the inertia of camera 46. For example, using the values of the example above, assuming that the camera zoom angle is $\alpha=5.7$ degrees, the distance between subject 12 and camera 46 is 400 feet, resulting in a frame width of 40 ft. If one assumes that the lag time is 0.6 seconds and that the subject 12 moves with a velocity of 40 feet per second. In 0.6 seconds, the subject 12 will move about 26 feet off center of the frame, meaning that the subject has moved outside the frame before location determination technology updates the subject's location. To avoid this situation, the zoom must be adjusted before the subject 12 goes off screen, i.e., when his/her speed is, for example, 20 feet per second and accelerating. The higher the lag time, the velocity, and the expected velocity, a wider camera angle $\alpha$ is chosen to keep recording the subject 12.

In applications where the lag of camera movement is significant, it may be counteracted by estimating the anticipated position of the target based on past location, velocity, and acceleration information and by instructing the positioner to move to an anticipated target angle. A process predicts "next" positions of subject 12 based on recent past s, v, and a (location, velocity, and acceleration) values using methods known to those having skill in the art. The angular velocity of positioning camera 46 is proportional to the size of the angle between a current position and "next" position of the subject 12. Using predicted "next" positions provides for faster camera movement when necessary.

The process used by base station 18 estimates or predicts the magnitude of possible orientation error due to lag time and due to the uncertainty of location determination technology. Base station 18 is programmed to send a signal to camera 46 to adjust the zoom such that the field of view is sufficiently wide. In practice, the lag time may be as much as one second. Preferably, the camera should zoom out such that the movement of subject 12 during the lag time does not take the subject out of the field of view.

Another reason for zoom adjustment may be that the location of the subject is temporarily unavailable or has been missing for a period of time. Such missing data points may be due to a variety of causes. For example, in the case of Location Determination Technology based on Global Positioning System, single data points may be missing due to various short term problems in satellite to antenna communication. Longer missing data sequences may be due, for example in a surfing application, to the subject being submerged in water. Also, radio communication between base station 18 and remote device 16 may be interrupted by interference. The process used by base station 18 is preferably designed to ignore single missing data points and to command camera 46 to zoom out when data is missing for multiple cycles. When the signal reappears, the subject 12 will likely be within the frame even if he or she has moved some considerable distance.

If there are no zoom out factors present, base station 18 sends a command to camera 46 to return to the zoomed-in state to produce recording with as high a resolution as feasible.

In a preferred embodiment, automatic video recording system 10 comprises a single positioner 32 and single camera 46 to track multiple remote devices 16. For example, at a sporting event multiple subjects 12 may be within the view of camera 46. The base station 18 computes an optimal direction for the camera, combined with appropriate zoom and focus based on the locations of multiple remote devices 16 to ensure that multiple subjects 12 appear within the field of view of camera 46. In one preferred embodiment, commands are directed to orienting camera 46 and adjusting its zoom and focus to capture all subjects 12 in its field of view, if possible, and to select some subjects for recording if recording all subjects is not possible. In a preferred embodiment, automatic video recording system 10 provides feedback to the multiple subjects being recorded so that they may know when they are in the field of view or being recorded by camera 46.

In the embodiment where multiple subjects 12 are recorded with a single camera 46 and all subjects 12 cannot appear in the view at the same time, a selection of a set of subjects must be made. The selected subject or subjects may be determined by a plurality of alternative methods. For example, the system maximizes the number of subjects able to be captured in the field of view at a preset minimum zoom; or the system tracks subjects in a preset hierarchy; a primary subject is tracked but when additional subjects are in the vicinity of the primary subject, the system adjusts orientation and/or zoom of the camera to capture the primary subject and nearby secondary subject or subjects.

In another preferred embodiment, camera 46 is a high resolution camera that has a sufficiently wide view angle to capture the desired subject's movements without changing its orientation. With the location and orientation of camera 46 known and the location of the subject 12 determined using a location determination technology, the system can crop the full video to the area just surrounding and including subject 12 to give the appearance in the cropped video that a camera 46 was following subject 12 with a high zoom level. An example of this embodiment employs a high resolution stationary camera facing a snow ski run, such that the view field of the camera encompasses the majority of the run. When a skier with a remote device 16 skis within the view field of camera 46, the software digitally crops the full video and outputs a video file that contains a zoomed-in view of the skier as he or she skis down the mountain. Multiple skiers may each carry their own remote devices 16 and the system can separately crop out the portions of each individual subject 12. The system keeps track of which video sections are associated with which specific remote device 16. For example, at the end of a day of skiing, each user may collect a DVD or other media storage device with the cropped videos of him or herself skiing that day. Alternatively, the videos may be uploaded to a server where each user may access their specific cropped video files. Because this embodiment records one wide angle shot and digitally crops sections of it based on the locations of the subjects within the view area, it is capable of producing cropped video recordings of multiple users who are simultaneously in different portions of the view area. If multiple skiers carrying remote devices 16 simultaneously ski through different portions of the view area of the camera 46, the system separately crops and stores the cropped video file of each user. In this embodiment, cropping the video is performed post-real time. By delaying the digital cropping process, the full path of the subject 12 is known prior to cropping the video. By synchronizing timestamps of the subject's location data and the timestamps on the captured video, and by accounting for the lag time in the data collection, an accurate determination of the target's location within the camera view field can be determined and the video can be cropped appropriately.

In a preferred embodiment of the automatic video recording system 10, a unique radio channel is used for two-way communication by a pair of remote device 16 and base station 18 that belong to the same user. In another preferred embodiment, multiple base stations 18 and remote devices 16 all use the same channel to communicate, but employ unique identification codes to pair a particular base station 18 with a particular remote device 16. In such an embodiment, a packet collision avoidance process may be used to ensure that paired units can easily communicate with each other while not disturbing or being disturbed by other base station-remote device pairs that may be in use in the same area. This is used to make the communication unique and allows the simultaneous use of several automatic video recording systems in the same vicinity.

It is noted that in the above description, the word camera is used to refer to a video camera, photography camera, a smart phone, a video capture device, etc.

Different preferred embodiments, methods, applications, advantages, and features of this invention have been described above; however, these particular embodiments, methods, applications, advantages, and features should not be construed as being the only ones that constitute the practice of the invention. Indeed, it is understood that the broadest scope of this invention includes modifications. Further, many other applications and advantages of applicant's invention will be apparent to those skilled in the art from the above descriptions and the below claims.

What is claimed is:

1. A waterproof electronic device comprising: a soft polymer embedding enclosure having an inner surface and an outer surface, and electronic and electromechanical components, and configured to seal said electronic and electromechanical components from water, wherein said inner surface is in direct contact with said electronic and electromechanical components and said electromechanical components comprise at least one microswitch, and wherein said at least one microswitch is operated by pressing on said outer surface of said soft polymer enclosure.

2. The waterproof electronic device of claim 1, further comprising a frame, wherein said frame is attached to said soft polymer enclosure and wherein said frame is made of a substantially hard material.

3. The waterproof electronic device of claim 2, further comprising at least one opening allowing passage of a strap for attaching said waterproof electronic device to a person.

4. The waterproof electronic device of claim 1, further comprising at least one circuit board having said electronic and electromechanical components connected to said at least one circuit board.

5. The waterproof electronic device of claim 1, wherein said electronic and electromechanical components comprise a microphone having an exposed surface area.

6. The waterproof electronic device of claim 1, wherein said electronic and electromechanical components comprise a speaker having an exposed surface area.

7. The waterproof electronic device of claim 1, said electronic components comprising a charging stub and portions of said charging stub are in direct contact with said inner surface of said soft polymer embedding enclosure and an exposed surface area of said charging stub is configured to provide electrical contact, and said exposed surface area of said charging stub is flush with said outer surface of said soft polymer embedding enclosure.

8. The waterproof electronic device of claim 1, further comprising a light emitting component and an optical component in direct contact with said inner surface of said soft polymer embedding enclosure forming a waterproof seal around said light emitting component and said optical component.

9. The waterproof electronic device of claim 8, wherein said light emitting component and said optical component comprise at least one light pipe having an exposed surface area, wherein said exposed surface area of said at least one light pipe is the light emitting end of said at least one light pipe.

10. The waterproof electronic device of claim 8, wherein said light emitting component and said optical component comprise a touchscreen having an exposed surface area, wherein said exposed surface area of said touchscreen is the touchable surface of said touchscreen.

* * * * *